(12) United States Patent
Kozaki et al.

(10) Patent No.: US 11,181,050 B2
(45) Date of Patent: Nov. 23, 2021

(54) VALVE OPENING AND CLOSING TIMING CONTROL APPARATUS

(71) Applicant: AISIN SEIKI KABUSHIKI KAISHA, Kariya (JP)

(72) Inventors: Tomohiro Kozaki, Kariya (JP); Seiichi Fujimoto, Chiryu (JP); Masaaki Kaneko, Aichi (JP); Tatsuki Okude, Toyota (JP); Tomoaki Fukao, Aichi (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 17/253,290

(22) PCT Filed: Jun. 7, 2019

(86) PCT No.: PCT/JP2019/022757
§ 371 (c)(1),
(2) Date: Dec. 17, 2020

(87) PCT Pub. No.: WO2019/244675
PCT Pub. Date: Dec. 26, 2019

(65) Prior Publication Data
US 2021/0270194 A1    Sep. 2, 2021

(30) Foreign Application Priority Data

Jun. 20, 2018 (JP) .............................. JP2018-117021

(51) Int. Cl.
*F02D 13/02* (2006.01)
*F02D 41/00* (2006.01)
(Continued)

(52) U.S. Cl.
CPC ..... *F02D 13/0238* (2013.01); *F02D 41/0005* (2013.01); *F02D 41/0235* (2013.01);
(Continued)

(58) Field of Classification Search
CPC ............. F02D 13/0238; F02D 41/0005; F02D 41/0235; F02D 41/025; F02D 41/123
(Continued)

(56) References Cited

U.S. PATENT DOCUMENTS 6,032,753 A    3/2000  Yamazaki et al.
6,161,521 A *  12/2000 Russ ................... F02D 13/0219
                                                    123/324

(Continued)

FOREIGN PATENT DOCUMENTS

JP    H09329060 A    12/1997
JP    2003074385 A    3/2003
(Continued)

OTHER PUBLICATIONS

International Search Report (PCT/ISA/210) dated Aug. 27, 2019, by the Japan Patent Office as the International Searching Authority for International Application No. PCT/JP2019/022757.
(Continued)

*Primary Examiner* — Erick R Solis
(74) *Attorney, Agent, or Firm* — Buchanan Ingersoll & Rooney PC

(57) ABSTRACT

A driving-side rotating body that rotates synchronously with a crankshaft of an internal combustion engine, a driven-side rotating body that is allowed to rotate relative to the driven-side rotating body and that rotates integrally with a camshaft that opens and closes an intake valve, and a phase adjustment mechanism for setting a relative rotation phase of the driving-side rotating body and the driven-side rotating body using a driving force of an electric motor are included. The phase adjustment mechanism is configured to be able to execute retarding control for setting the relative rotation phase to the retarding side until reaching a phase in which the internal combustion engine cannot be started and autono-
(Continued)

mous running is not possible even if fuel injection and ignition are performed in the internal combustion engine.

13 Claims, 18 Drawing Sheets

(51) Int. Cl.
  *F02D 41/02* (2006.01)
  *F02D 41/38* (2006.01)
  *F02D 41/14* (2006.01)
  *F02D 41/04* (2006.01)
  *F02D 41/12* (2006.01)

(52) U.S. Cl.
  CPC ......... *F02D 41/042* (2013.01); *F02D 41/123* (2013.01); *F02D 41/1454* (2013.01); *F02D 41/38* (2013.01); *F02D 2200/0802* (2013.01)

(58) Field of Classification Search
  USPC .................... 123/90.15–90.18, 325; 701/103
  See application file for complete search history.

(56) References Cited

U.S. PATENT DOCUMENTS

| | | | |
|---|---|---|---|
| 8,849,550 B2* | 9/2014 | Larsson | F02D 41/0245 701/112 |
| 2004/0187819 A1 | 9/2004 | Takenaka et al. | |
| 2012/0234274 A1 | 9/2012 | Hisaminato et al. | |
| 2021/0156324 A1* | 5/2021 | Gallon | F02D 9/02 |

FOREIGN PATENT DOCUMENTS

| | | |
|---|---|---|
| JP | 2004316635 A | 11/2004 |
| JP | 2006070824 A | 3/2006 |
| JP | 2012017671 A | 1/2012 |
| JP | 2013011284 A | 1/2013 |
| JP | 2017172544 A | 9/2017 |
| WO | 2011067865 A1 | 6/2011 |

OTHER PUBLICATIONS

Written Opinion (PCT/ISA/237) dated Aug. 27, 2019, by the Japan Patent Office as the International Searching Authority for International Application No. PCT/JP2019/022757.

* cited by examiner

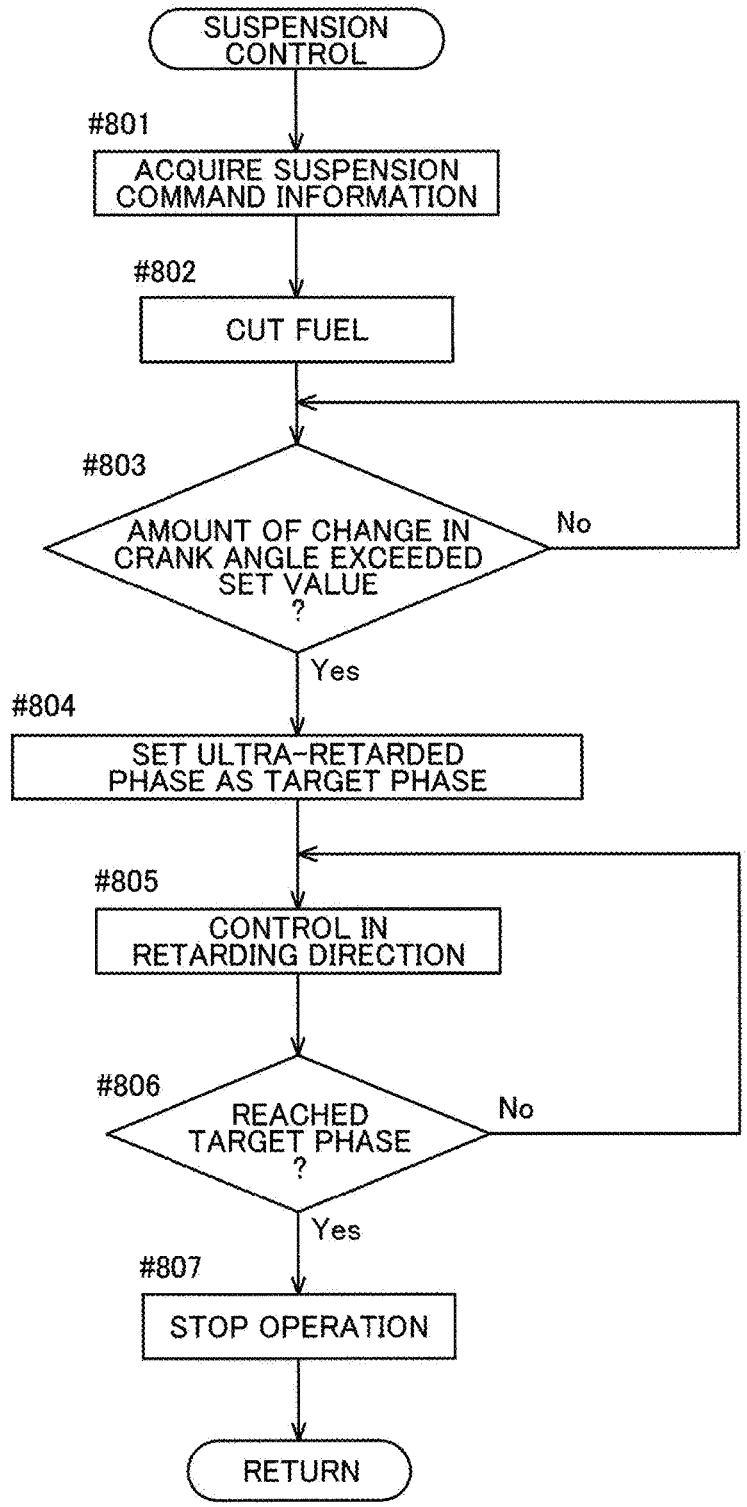

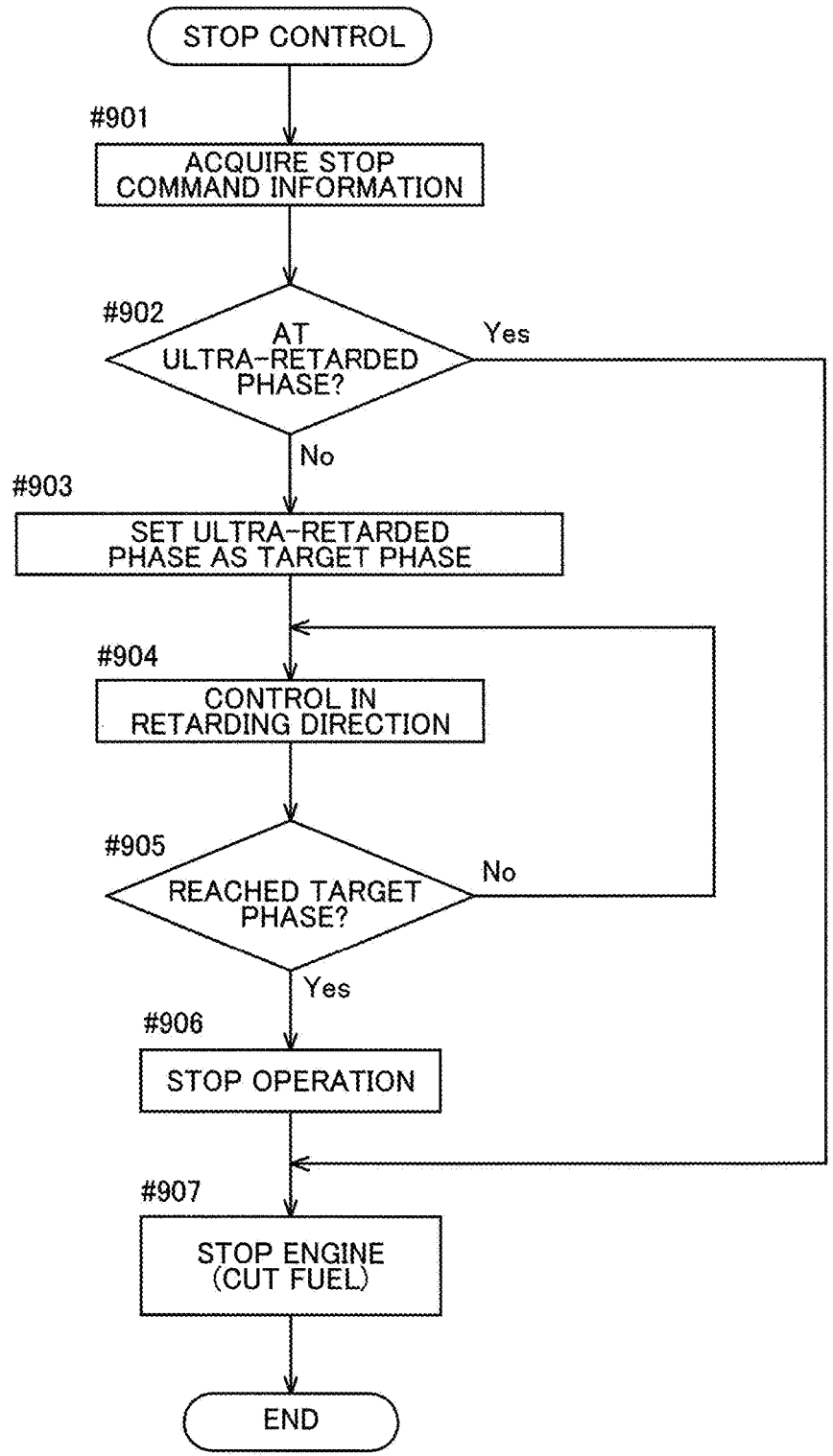

VALVE OPENING AND CLOSING TIMING CONTROL APPARATUS

TECHNICAL FIELD

The present invention relates to a valve opening and closing timing control apparatus for setting an opening/closing timing of an intake valve of an internal combustion engine.

BACKGROUND ART

Many vehicles equipped with an internal combustion engine include a catalyst that purifies exhaust gas of the internal engine. It is known that if the temperature of the catalyst decreases or if air comes into contact with the catalyst, the performance of the catalyst decreases due to the influence of oxygen. In order to resolve this kind of problem, the techniques disclosed in Patent Document 1 and Patent Document 2 have also been proposed.

That is, Patent Document 1 discloses a technique in which, if fuel cutting control is performed during driving of the internal combustion engine ("engine" in Patent Document 1) and combustion is suspended, the exhaust gas (strictly speaking, the air discharged from the combustion chamber) is recirculated in the intake cylinder, and thereby the exhaust gas is not allowed to flow to the catalyst.

In this Patent Document 1, a recirculation pipe is included between the upstream side of the catalyst and the intake cylinder of the internal combustion engine, and an opening/closing valve that opens and closes the recirculation pipe is included. If fuel cutting control is performed, by controlling the opening/closing valve, the exhaust gas that flows to the catalyst is blocked, and an inconvenience in which the air comes into contact with and cools the catalyst due to the exhaust gas being returned from the exhaust side to the intake side is eliminated.

Also, Patent Document 2 discloses a technique in which, if fuel cutting with respect to the internal combustion engine ("engine" in Patent Document 2) is performed with an accelerator fully-closed operation, the opening/closing timing of the intake valve is retarded through control performed by a valve opening and closing timing control apparatus ("intake opening/closing valve timing adjustment mechanism" in Patent Document 2), the air that comes into contact with the catalyst is reduced, and the performance decrease of the catalyst is suppressed.

With Patent Document 2, if combustion is suspended, reduction of the exhaust flow amount from the combustion chamber is enabled by blowing a portion of the taken-in air back to the intake side in a compression stroke due to performing retarding control using the valve opening and closing timing control apparatus.

CITATION LIST

Patent Literature

Patent Document 1: JP H09-329060A
Patent Document 2: JP 2006-70824A

SUMMARY OF INVENTION

Technical Problem

However, if a recirculation pipe is included and an opening/closing valve that opens and closes the recirculation pipe is included as disclosed in Patent Document 1, although an inconvenience in which the air discharged from the combustion chamber comes into contact with the catalyst can be suppressed, there is room for improvement from the viewpoint that the structure of the internal combustion engine is complicated, the number of components increases, and a cost increase is incurred.

Also, in a technique in which the valve opening and closing timing control apparatus is subjected to retarding control if fuel cutting is performed as disclosed in Patent Document 2, although it is possible to reduce the amount of air discharged from the combustion chamber, it has also been thought that the amount of air that is reduced will be insufficient.

That is, even if the conventional valve opening and closing timing control apparatus that controls the intake valve is set to the maximum retarding phase, the piston reaches a closed state before reaching top dead center, and therefore even though the amount of air in the combustion chamber is small, the air will be compressed at the time when the piston reaches top dead center. Accordingly, it is also thought that when the exhaust valve opens in the subsequent exhaust stroke, the air compressed in the combustion chamber will be sent out to an exhaust path and come into contact with the catalyst.

For this reason, a valve opening and closing timing control apparatus is required which significantly reduces the amount of air discharged from the combustion chamber to the exhaust side in a state in which the combustion in the internal combustion engine is suspended.

Solution to Problem

A characteristic configuration of a valve opening and closing timing control apparatus according to the present invention includes: a driving-side rotating body that is arranged rotatably about a rotation axis and is configured to rotate synchronously with a crankshaft of an internal combustion engine; a driven-side rotating body that is arranged rotatably about the rotation axis so as to rotate relative to the driving-side rotating body, and is configured to rotate integrally with a camshaft that opens and closes an intake valve of the internal combustion engine; a phase adjustment mechanism configured to set a relative rotation phase of the driving-side rotating body and the driven-side rotating body using a driving force of an electric motor; and a suspension control unit configured to perform retarding control for setting the relative rotation phase on a retarding side until reaching a phase in which the internal combustion engine cannot be started and autonomous running is not possible even if fuel injection and ignition are performed in the internal combustion engine.

In retarding control in a normal valve opening and closing timing control apparatus, even if the relative rotation phase is set to the maximum retarding side, it is possible to start the internal combustion engine. On the other hand, according to the characteristic configuration of the present invention, due to the suspension control unit performing the retarding control, the valve opening and closing timing control apparatus is set to a phase in which the internal combustion engine cannot be started and autonomous running of the internal combustion engine is not possible. Since this phase is a phase in which compression of mixed air is hardly performed at all in the combustion chamber, the air is hardly compressed at all in the combustion chamber in the compression stroke. For this reason, even if the piston rises in a state in which the exhaust valve is open in the subsequent exhaust stroke, the air is hardly discharged at all from the combustion chamber.

The valve opening and closing timing control apparatus that significantly reduces the amount of air discharged from the combustion chamber to the exhaust side is configured in this manner. In particular, in this configuration, for example, in a vehicle in which the catalyst for purifying the exhaust gas is included on an exhaust path of the internal combustion engine, even if combustion is suspended in a combustion chamber, an inconvenience in which air from the combustion chamber is brought into contact with the catalyst can be eliminated.

As another configuration, through the retarding control, the suspension control unit may also open the intake valve until a compression stroke ends in a combustion chamber of the internal combustion engine.

According to this configuration, due to the suspension control unit performing retarding control, the intake valve is open until the piston reaches top dead center in the compression stroke, and therefore the air is not compressed in the combustion chamber. Then, if the piston rises in a state in which the exhaust valve is open in the subsequent exhaust stroke, the air is not discharged from the combustion chamber.

As another configuration, the suspension control unit is allowed to perform suspension control for suspending combustion in the combustion chamber of the internal combustion engine through fuel cutting, and when the crankshaft rotates due to a force from outside of the internal combustion engine in a state in which the suspension control is being executed, the suspension control unit may also perform the retarding control after the rotation is started.

According to this configuration, if the crankshaft rotates due to the rotation force of the wheels (force from the outside) as in the case where the vehicle travels due to inertia or the like while combustion is suspended in the combustion chamber of the internal combustion engine due to the suspension control unit performing fuel cutting, the retarding control is performed, whereby it is possible to suppress a phenomenon in which the air is sent out from the combustion chamber to the exhaust path. To give a specific example, in a state in which the internal combustion engine is kept in the suspended state and travel is performed using the driving force of the travel motor as in a hybrid car, if control for transmitting the driving force of the wheels to the crankshaft is performed, the retarding control is performed accompanying the rotation of the crankshaft, whereby it is possible to significantly reduce the amount of air discharged from the combustion chamber to the exhaust path.

As another configuration, the suspension control unit is allowed to perform suspension control for suspending combustion in the combustion chamber of the internal combustion engine through fuel cutting, and a timing at which the retarding control is executed may also be set to immediately after the suspension control is executed.

According to this configuration, by performing retarding control immediately after suspension control for suspending the combustion in the combustion chamber of the internal combustion engine on the internal combustion engine in the running state due to the suspension control unit performing fuel cutting, for example, an inconvenience is avoided in which the retarding control is performed in a state in which mixed air remains in the combustion chamber, and thus misfiring is not incurred.

As another configuration, a catalyst temperature acquisition unit configured to acquire a temperature of a catalyst for purifying exhaust gas of the internal combustion engine may be further included, and in a state in which the suspension control in which combustion in the combustion chamber of the internal combustion engine is suspended through fuel cutting has been executed, the suspension control unit may also perform determination of whether or not the retarding control is needed based on a catalyst temperature acquired by the catalyst temperature acquisition unit.

The catalyst is kept in an active state at a predetermined temperature and realizes optimal purification of the exhaust gas. Also, the temperature of the catalyst rises due to reaction heat when oxygen is supplied immediately after the internal combustion engine is suspended. Furthermore, a phenomenon is recognized in which a temperature decrease is incurred in the catalyst when the supply of oxygen is blocked immediately after the internal combustion engine is suspended. For this reason, due to the suspension control unit determining whether or not retarding control is needed based on the temperature acquired by the catalyst temperature acquisition unit in a state in which the suspension control has been performed, the amount of air that passes through the combustion chamber when the crankshaft of the internal combustion engine in the suspended state rotates is controlled, and temperature management of the catalyst is enabled.

As another configuration, the suspension control unit may also not perform the retarding control if the catalyst temperature acquired by the catalyst temperature acquisition unit is less than a first set temperature.

Accordingly, since retarding control is not performed if the temperature of the catalyst is less than a first set temperature in a state in which the internal combustion engine is suspended, if the crankshaft of the internal combustion engine in the suspended state rotates, the air that has passed through the combustion chamber accompanying the rotation can be supplied to the catalyst, and the temperature of the catalyst can be raised by the heat of reaction with the oxygen included in the air.

As another configuration, the suspension control unit may also perform the retarding control if the catalyst temperature acquired by the catalyst temperature acquisition unit is a second set temperature or more.

According to this configuration, in a state in which the internal combustion engine is suspended, retarding control is performed when the temperature of the catalyst is a second set temperature or more, and therefore even if the crankshaft of the internal combustion engine in the suspended state rotates, the amount of air passing through the combustion chamber accompanying rotation decreases, and it is possible to suppress an increase in the temperature of the catalyst.

As another configuration, an oxygen concentration acquisition unit configured to acquire an oxygen concentration of oxygen included in a catalyst for purifying exhaust gas of the internal combustion engine may also be further included, and in a state in which the suspension control in which combustion in the combustion chamber of the internal combustion engine is suspended through fuel cutting has been performed, the suspension control unit may also perform determination of whether or not the retarding control is needed based on the oxygen concentration acquired by the oxygen concentration acquisition unit.

A catalyst that has a function of accumulating oxygen enables purification due to the oxygen accumulated in the catalyst coming into contact with a substance to be purified that is included in the exhaust gas, and it is desirable that a predetermined amount of oxygen is accumulated in order to deal with an increase or decrease in the amount of the substance to be purified that is included in the exhaust gas or a change in the reaction mode. Also, since the catalyst that has the function of accumulating oxygen accumulates the oxygen included in the exhaust gas, in a state in which the suspension control is executed, the suspension control unit determines whether or not the retarding control is needed based on the oxygen concentration acquired by the oxygen concentration acquisition unit, whereby the amount of air passing through the combustion chamber accompanying the rotation of the crankshaft of the internal combustion engine in the suspended state is controlled, and as a result, management of the amount of oxygen accumulated in the catalyst is enabled.

As another configuration, the suspension control unit may also not perform the retarding control if the oxygen concentration acquired by the oxygen concentration acquisition unit is less than a set concentration value.

Accordingly, in a state in which the internal combustion engine is suspended, if the oxygen concentration of the catalyst is less than a set concentration value, retarding control is not performed, and therefore it is possible to supply the air that has passed through the combustion chamber to the catalyst accompanying the rotation of the crankshaft of the internal combustion engine in the suspended state, and therefore it is possible to accumulate the oxygen included in the air in the catalyst.

As another configuration, the suspension control unit may also perform the retarding control if the oxygen concentration acquired by the oxygen concentration acquisition unit is a set concentration value or more.

Accordingly, in a state in which the internal combustion engine is stopped, if the oxygen concentration of the catalyst is a set concentration value or more, retarding control is performed, and thereby the amount of air passing through the combustion chamber accompanying the rotation of the crankshaft of the internal combustion engine is significantly reduced, and the oxygen concentration of the catalyst is not excessively raised.

As another configuration, the internal combustion engine may also have a structure with a plurality of cylinders, and be configured to supply fuel and perform ignition in a predetermined order in respective combustion chambers of the plurality of cylinders, the suspension control unit is allowed to perform suspension control for suspending combustion in the combustion chambers of the internal combustion engine through fuel cutting, and if suspension command information for performing the suspension control has been acquired, the suspension control unit may also set the cylinder in which combustion is to be performed immediately after the timing of acquiring the suspension command information as a final combustion cylinder, and perform the retarding control immediately after closing an intake valve of the final combustion cylinder after combustion in the final combustion cylinder.

According to this configuration, if the suspension control unit has acquired the suspension command information, the cylinder in which combustion is performed immediately after the timing of acquiring the suspension command information is set as the final combustion cylinder, fuel cutting is performed after combustion in the final combustion cylinder, and the internal combustion engine can be suspended by performing retarding control immediately after the intake valve of the final combustion cylinder is closed.

The catalyst deteriorates or erodes in some cases due to oxygen being supplied thereto. In contrast to this, in the present configuration, it is possible to shorten the amount of time from the timing of acquiring the suspension command information through the suspension control to when the internal combustion engine is suspended, and thus the air passing through the combustion chamber is not needlessly supplied, and deterioration and erosion of the catalyst can be suppressed. Also, since the relative rotation phase of the valve opening and closing timing control apparatus is significantly changed to the retarding side in the retarding control, not only can the load acting on the rotation of the crankshaft be reduced and the amount of shaking accompanying the stopping of the combustion engine be reduced, but it is also possible to reduce the amount of air that flows in the catalyst from the combustion chamber even if the crankshaft rotates in the suspended state.

As another configuration, the internal combustion engine may also include an injector for injecting fuel into the respective combustion chambers of the plurality of cylinders, and the suspension control unit may also set the cylinder into which fuel has been injected by the injector immediately after the timing of acquiring the suspension command information as the final combustion cylinder.

Accordingly, due to the cylinder including the injector that performs injection of fuel immediately after the timing of acquiring the suspension command information being set as the final combustion cylinder, it is possible to rapidly transition to the suspended state without performing needless combustion.

As another configuration, the internal combustion engine may also include an injector for injecting fuel into respective intake ports of the plurality of cylinders, and the suspension control unit may also set the cylinder into which fuel has been injected by the injector immediately before the timing of acquiring the suspension command information as the final combustion cylinder.

Accordingly, due to the cylinder provided with the injector that performed injection of fuel immediately before the timing of acquiring the suspension command information being set as the final combustion cylinder, it is possible to transition to the suspended state without performing needless combustion.

BRIEF DESCRIPTION OF DRAWINGS

FIG. 20 is a flowchart for suspension control of another embodiment (f).

FIG. 21 is a flowchart for stop control of another embodiment (g).

DESCRIPTION OF EMBODIMENTS

Hereinafter, a first embodiment of the present invention will be described with reference to the drawings.
(Basic Configuration)

Figure 1:
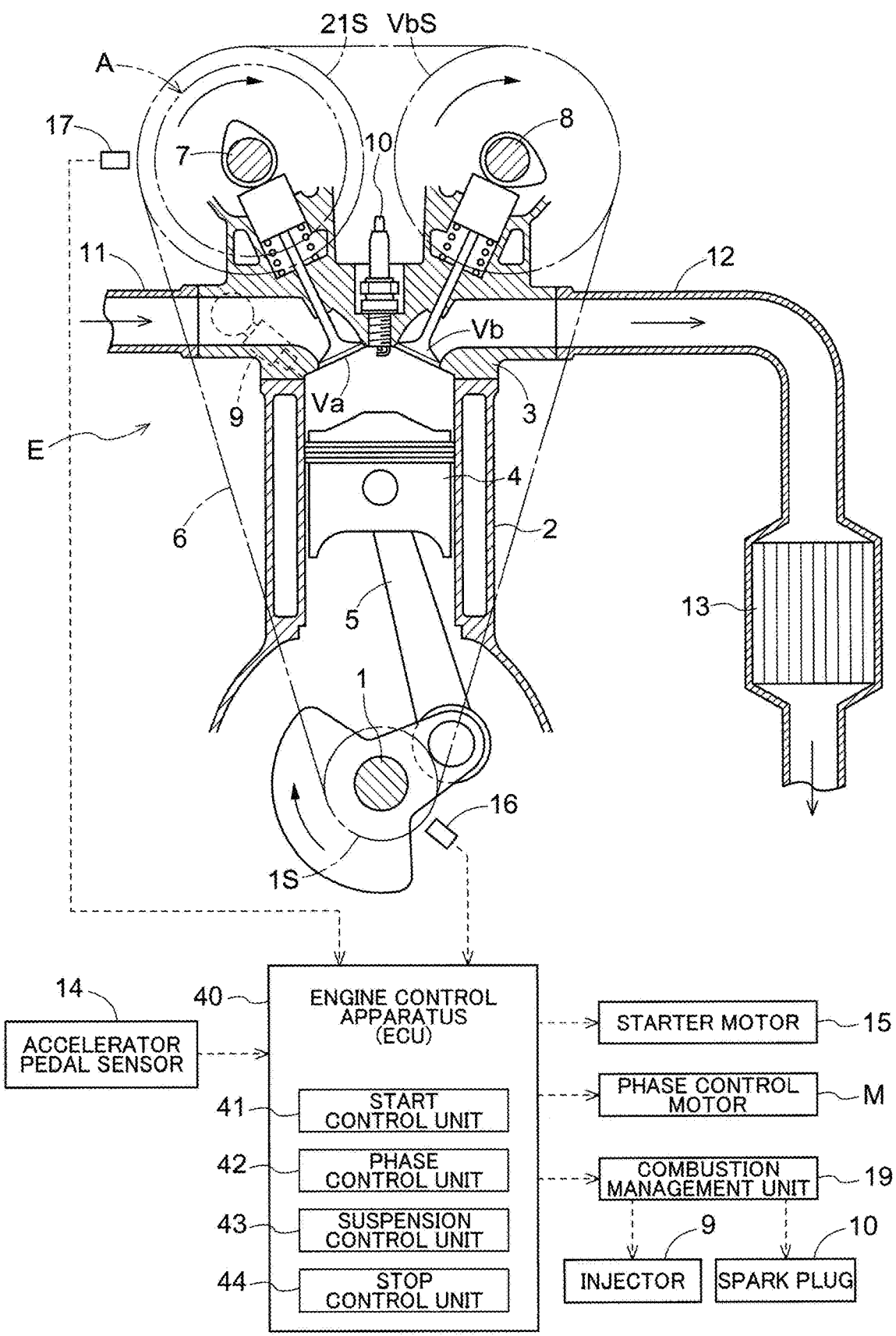
FIG. 1 is a diagram showing a cross section of an engine of a first embodiment and a control unit.

As shown in FIG. 1, an engine E serving as an internal combustion engine includes an intake valve Va and an exhaust valve Vb, and includes a valve opening and closing timing control apparatus A that sets the opening/closing timing of the intake valve Va. The engine E includes an engine control apparatus 40 that functions as an ECU for controlling the valve opening and closing timing control apparatus A and the engine E.

Figure 2:
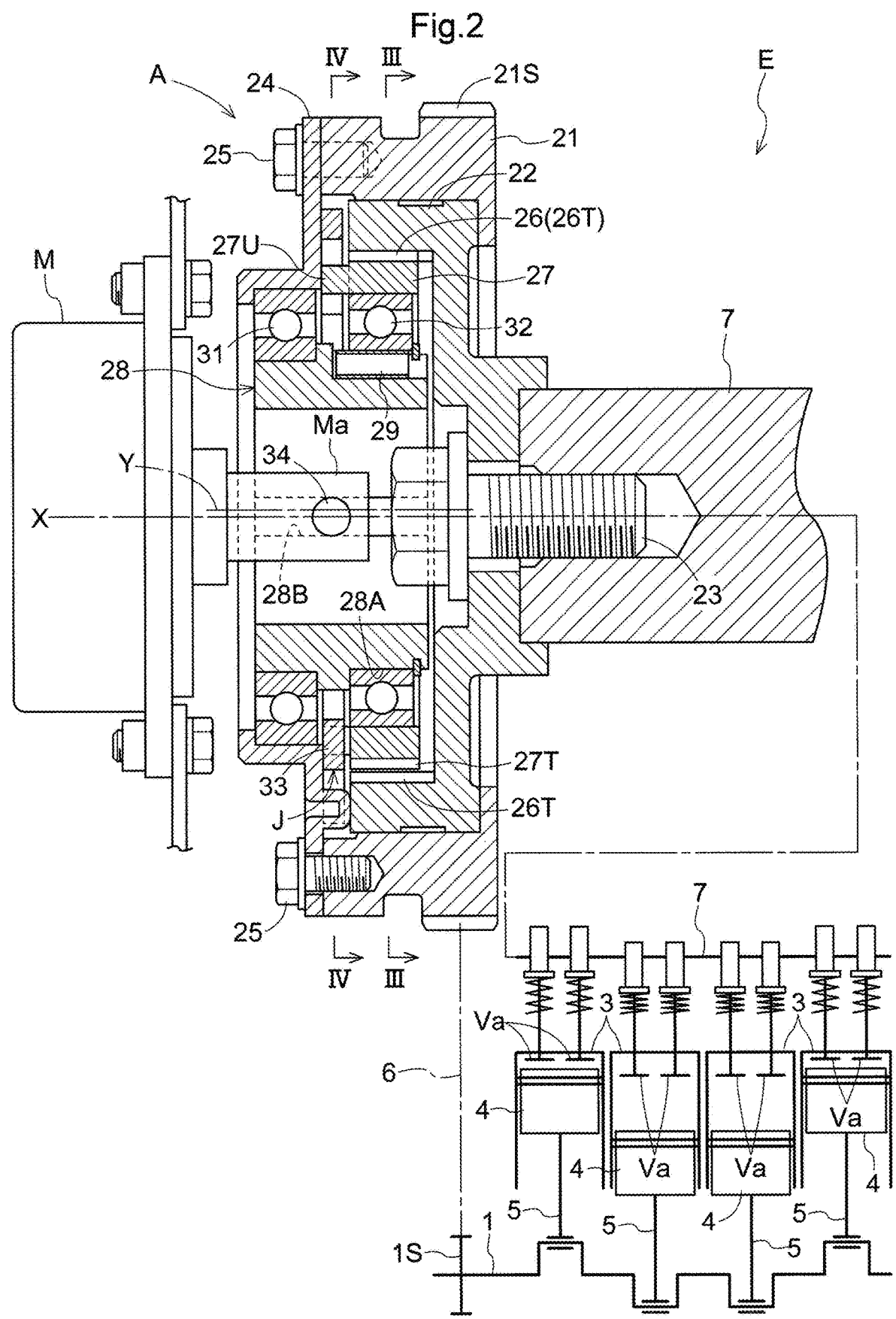
FIG. 2 is a cross-sectional view of a valve opening and closing timing control apparatus.

It is envisioned that the engine E (one example of an internal combustion engine) shown in FIGS. 1 and 2 is provided in a vehicle such as a passenger car, the driving force of the engine E is subjected to gear shifting using a transmission case, and the traveling of the vehicle is enabled by transmitting the driving force to the wheels.

The engine E is formed into a four-cycle type by joining a cylinder head 3 to the upper portion of a cylinder block 2 that supports a crankshaft 1, accommodating a piston 4 in multiple cylinder bores formed in the cylinder block 2 so as to be able to perform a reciprocal operation, and joining the piston 4 to the crankshaft 1 using a connecting rod 5.

The intake valve Va and the exhaust valve Vb are included in the cylinder head 3, and an intake camshaft 7 that controls the intake valve Va and an exhaust camshaft 8 that controls the exhaust valve Vb are included on the upper portion of the cylinder head 3. Also, a timing belt 6 is wrapped around an output pulley 1S of the crankshaft 1, and a driving pulley 21S of the valve opening and closing timing control apparatus A and exhaust pulley VbS of the exhaust valve Vb. In the engine E, the combustion chamber is formed on the upper side relative to the piston 4 among the cylinder bores.

An injector 9 that injects fuel into the combustion chamber and a spark plug 10 are included in the cylinder head 3. An intake manifold 11 that supplies air to the combustion chamber via the intake valve Va and an exhaust manifold 12 that sends combusted gas from the combustion chamber via the exhaust valve Vb are joined to the cylinder head 3. Furthermore, a catalyst 13 that purifies the exhaust gas is included on the exhaust path by which the exhaust gas is sent from the exhaust manifold 12.

In the engine E, a starter motor 15 that drives and rotates the crankshaft 1 is included, a shaft sensor 16 that can detect the rotation angle is included at a position near the crankshaft 1, and a cam angle sensor 17 that can detect the rotation angle of the intake camshaft 7 is included near the intake camshaft 7.

The engine control apparatus 40 functions as an ECU that controls the engine E, and includes a start control unit 41, a phase control unit 42, a suspension control unit 43, and a stop control unit 44. Control of the engine control apparatus 40 will be described in detail later.

The engine control apparatus 40 performs cylinder identification for identifying the cylinder in which combustion is to be performed based on the detection result of the shaft sensor 16 and the detection result of the cam angle sensor 17, and performs detection of the relative rotation phase of the valve opening and closing timing control apparatus A based on the detection result of the shaft sensor 16 and the detection result of the cam angle sensor 17. As will be described later, the relative rotation phase is the relative angle centered about a rotation axis X of a driving case 21 (one example of a driving-side rotating body) and an internal rotor 22 (one example of a driven-side rotating body), and the opening/closing timing (valve timing) of the intake valve Va is determined based on the relative rotation phase.
(Valve Opening/Closing Timing Control Apparatus)

As shown in FIGS. 2 to 5, the valve opening and closing timing control apparatus A includes the driving case 21 (driving-side rotating body) and the internal rotor 22 (driven-side rotating body), and includes a phase adjustment mechanism that sets the relative rotation phase thereof according to the driving force of a phase control motor M (one example of an electric motor).

The driving pulley 21S is formed on the outer periphery of the driving case 21, and the driving case 21 is arranged coaxially with the rotation axis X of the intake camshaft 7. The internal rotor 22 is contained so as to be able to rotate relative to the driving case 21, and is joined and fixed to the intake camshaft 7 by a joining bolt 23. The phase adjustment mechanism is arranged between the driving case 21 and the internal rotor 22, a front plate 24 is arranged at a position covering an opening portion of the driving case 21, and these elements are fastened to the driving case 21 by multiple fastening bolts 25.

Figure 3:
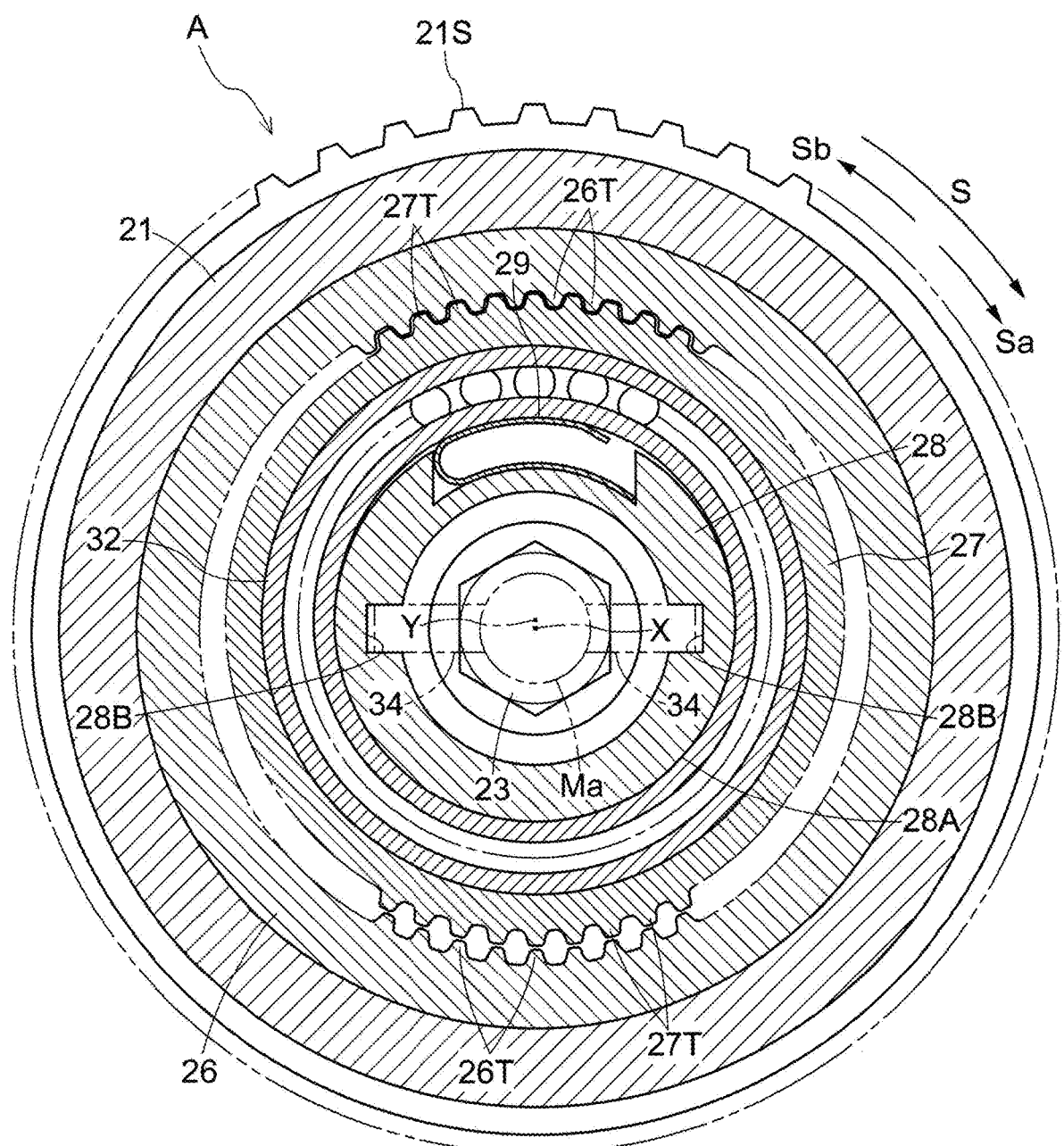
FIG. 3 is a cross-sectional view taken along line III-III in FIG. 2.
Figure 4:
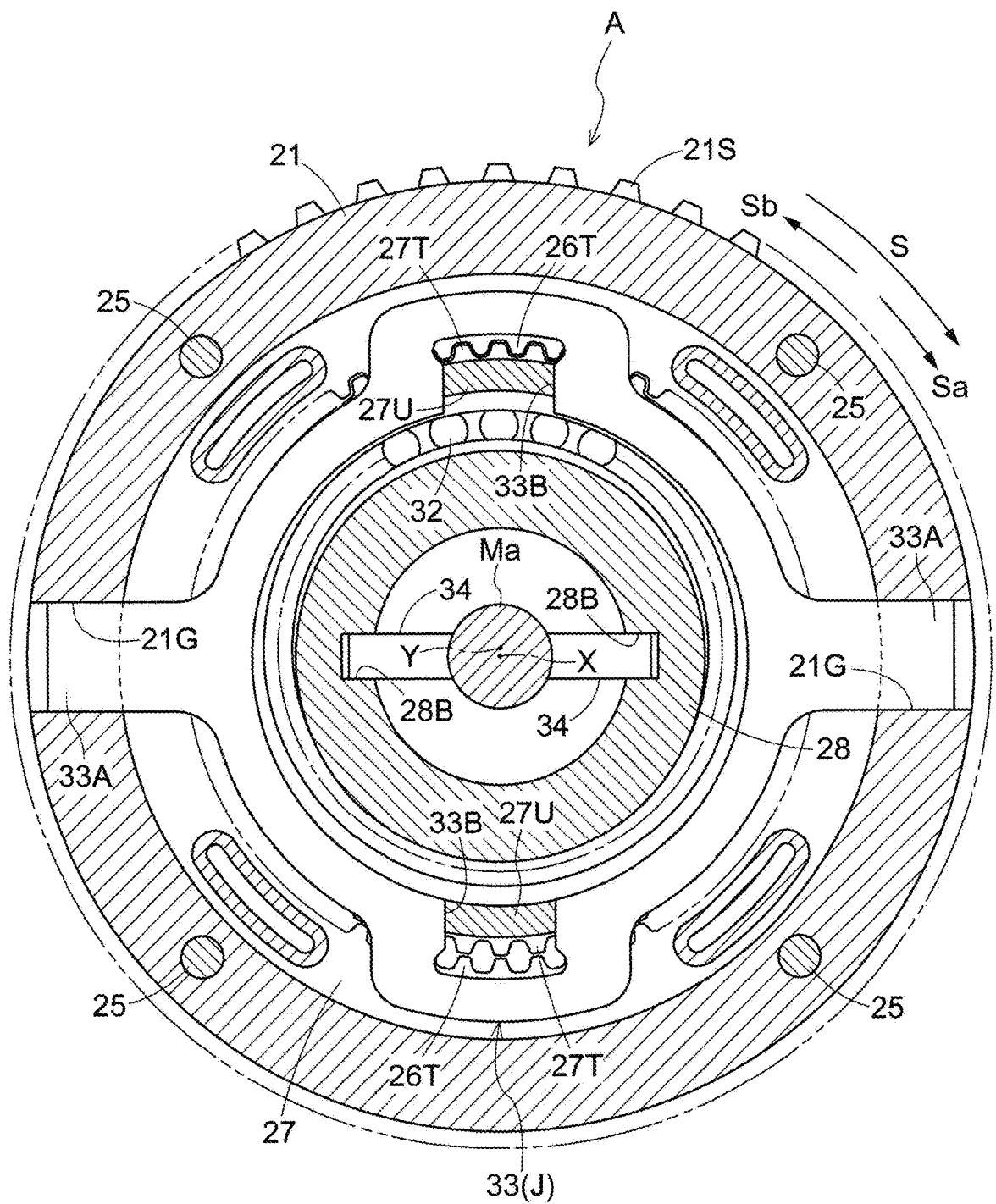
FIG. 4 is a cross-sectional view taken along line IV-IV in FIG. 2.
Figure 5:
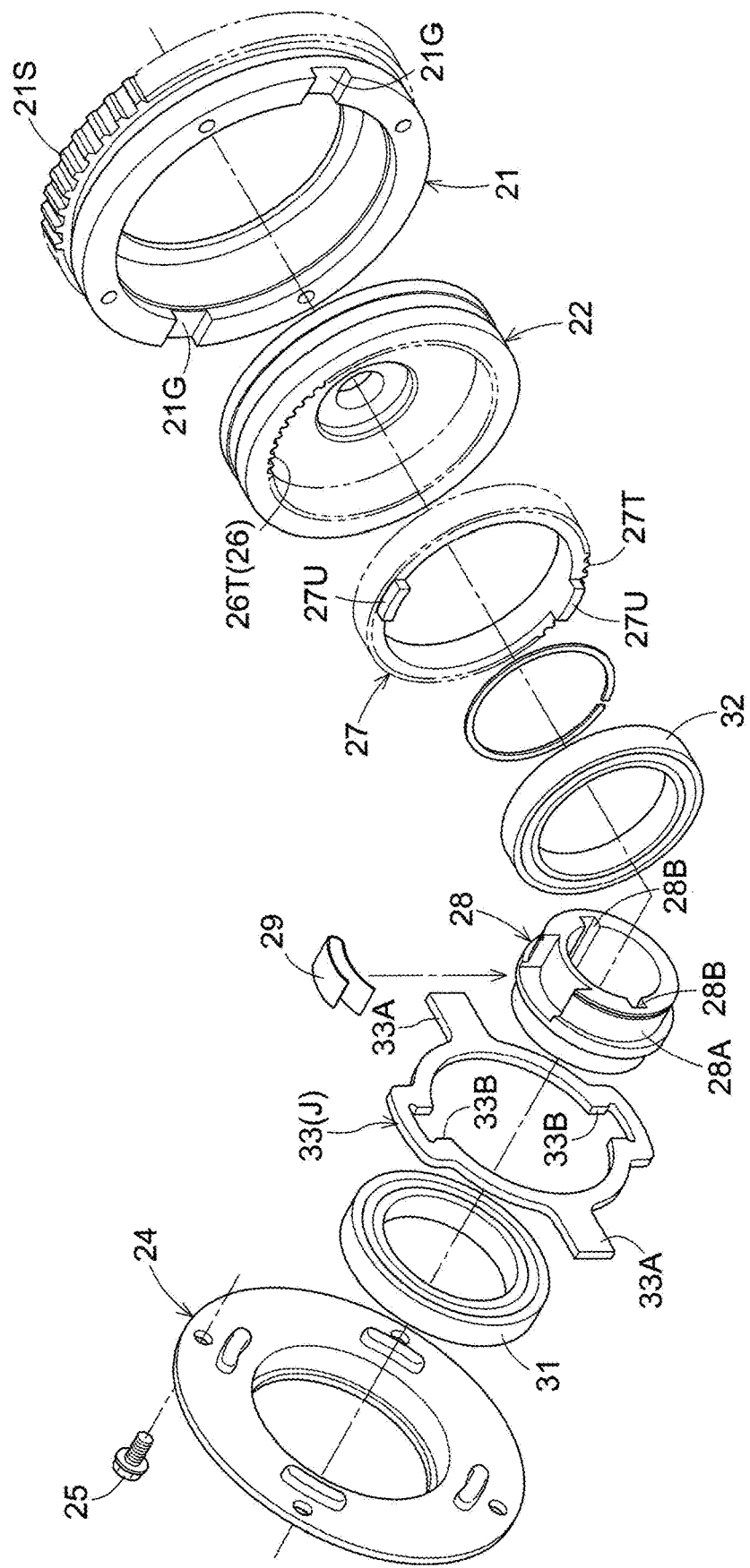
FIG. 5 is an exploded perspective view of a valve opening and closing timing control apparatus.

The entirety of the valve opening and closing timing control apparatus A rotates in a drive rotation direction S due to the driving force from the timing belt 6 as shown in FIG. 3. The direction in which the relative rotation phase of the internal rotor 22 with respect to the driving case 21 heads in the same direction as the drive rotation direction S due to the driving force of the phase control motor M (electric motor) is called the advancing direction Sa, and the opposite direction is called the retarding direction Sb.
(Valve Opening/Closing Timing Control Apparatus: Phase Adjustment Mechanism)

The phase adjustment mechanism includes a ring gear 26 that has multiple inner tooth portions 26T formed in one piece on the inner periphery of the internal rotor 22 and is arranged coaxially with the rotation axis X, and includes an inner gear 27 that has multiple outer tooth portions 27T for meshing with the inner tooth portions 26T and is arranged coaxially with an eccentric axis Y in an orientation that is parallel to the rotation axis X, and includes an eccentric cam body 28 and a joint portion J.

In this phase adjustment mechanism, an inner gear 27 in which the number of outer tooth portions 27T is one less than the number of inner tooth portions 26T of the ring gear 26 is used.

The joint portion J is constituted as an Oldham's coupling that allows displacement of the inner gear 27 with respect to the driving case 21 in a direction orthogonal to the rotation axis X, and hinders relative rotation between the driving case 21 and the inner gear 27.

The eccentric cam body 28 is supported by a first bearing 31 relative to the front plate 24 so as to rotate coaxially with the rotation axis X. An eccentric cam surface 28A centered about the eccentric axis Y in an orientation parallel to the rotation axis X is formed in one piece with the eccentric cam body 28, and the inner gear 27 is rotatably supported relative to the eccentric cam surface 28A via a second bearing 32. A spring body 29 is fitted into a recess formed in the eccentric cam surface 28A, and the biasing force of the spring body 29 is exerted on the inner gear 27 via the second bearing 32.

The eccentric cam body 28 has an overall tubular shape, and a pair of engagement grooves 28B are formed in the inner periphery thereof in an orientation parallel to the rotation axis X.

Consequently, some of the outer tooth portions 27T of the inner gear 27 mesh with some of the inner tooth portions 26T of the ring gear 26. Although the first bearing 31 and the second bearing 32 are formed by ball bearings, they may also be formed by bushes.

The joint portion J includes a joint member 33 formed by pressing a plate material, and is constituted by engaging a pair of engaging arms 33A formed on the joint member 33 with engagement groove portions 21G of the driving case 21, and engaging a pair of engaging recesses 33B formed on the joint member 33 with engaging protrusions 27U of the inner gear 27.

That is, the central portion of the joint member 33 is formed into a ring shape, and has a configuration in which the pair of engaging arms 33A are formed protruding outward from the central portion of the ring shape, and the pair of engaging recesses 33B are formed so as to be continuous with the space in the central portion of the ring shape.

In the joint portion J, the joint member 33 is displaceable in a direction of a straight line connecting the pair of engaging groove portions 21G of the driving case 21, and the inner gear 27 is displaceable, relative to the joint member 33, in a direction of a straight line connecting the pair of the engaging protrusions 27U.

The phase control motor M is supported by the engine E and includes an engagement pin 34 that is in an orthogonal orientation with respect to the output axis Ma, and the engagement pin 34 is fit into engagement grooves 28B on the inner periphery of the eccentric cam body 28. Note that although a brushless DC motor is used as the phase control motor M, a synchronization motor such as a stepping motor may also be used.

Based on this kind of configuration, when the mode of operation of the phase adjustment mechanism is considered in a state in which the engine E is stopped, if the eccentric cam body 28 rotates using the driving force of the phase control motor M, the eccentric cam surface 28A rotates centered about the rotation axis X, and the inner gear 27 starts revolving about the rotation axis X accompanying this rotation. During this revolution, the position at which the outer tooth portions 27T of the inner gear 27 and the inner tooth portions 26T of the ring gear 26 mesh together moves along the inner periphery of the ring gear 26, and therefore a force that causes self-rotation centered about the eccentric axis Y is applied to the inner gear 27.

In this manner, when the inner gear 27 makes only one revolution, a rotational force (self-rotation force) to rotate the inner gear 27 by an angle (angle corresponding to one tooth) corresponding to the difference (tooth count difference) between the number of inner tooth portions 26T of the ring gear 26 and the number of outer tooth portions 27T of the inner gear 27 acts on the inner gear 27.

As described above, since the joint portion J has a structure in which the rotation of the inner gear 27 with respect to the driving case 21 is restricted, even if the eccentric cam body 28 rotates due to the driving force of the phase control motor M, the inner gear 27 does not rotate with respect to the driving case 21, the ring gear 26 rotates with respect to the driving case 21 due to the rotation force applied to the inner gear 27, and as a result of the internal rotor 22 performing relative rotation integrally with the ring gear 26, adjustment of the relative rotation phase of the intake camshaft 7 with respect to the driving case 21 is realized.

In particular, when the inner gear 27 makes one revolution about the rotation axis X, adjustment is achieved with a high speed reduction ratio, since the intake camshaft 7 is rotated relative to the driving case 21 by an angle corresponding to the difference (tooth count difference) between the number of the outer tooth portions 27T of the inner gear 27.

(Relative Rotation Phase and Opening/Closing Timing)

Figure 6:
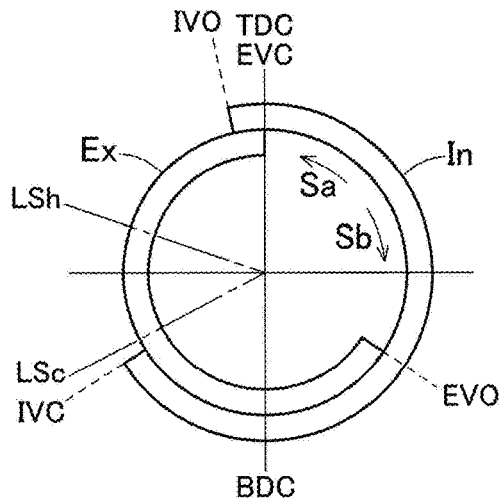
FIG. 6 is a timing diagram in which an intake timing is set on an advancing side.
Figure 7:
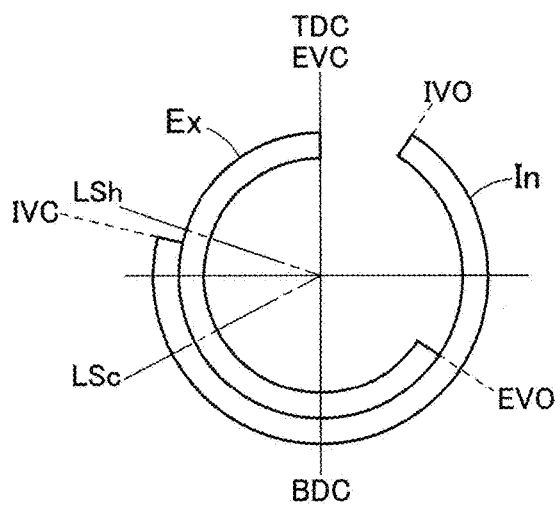
FIG. 7 is a timing diagram in which the intake timing is set on a retarding side.

FIGS. 6 and 7 show an exhaust opening timing EVO and an exhaust closing timing EVC of the exhaust valve Vb, and show an intake opening timing IVO and an intake closing timing IVC of the intake valve Va that is controlled by the valve opening and closing timing control apparatus A. As shown in these drawings, the exhaust opening timing EVO and the exhaust closing timing EVC are fixed, and the exhaust closing timing EVC is set to a timing that matches a top dead center TDC.

The intake opening timing IVO and the intake closing timing IVC are set in a range between the limit of the advancing direction Sa shown in FIG. 6 and the limit of the retarding direction Sb shown in FIG. 7 by controlling the valve opening and closing timing control apparatus A when the engine E is running. Also, the limit on the retarding side of the intake closing timing IVC that enables starting of the engine E tends to be changed to the retarding side more the higher the temperature of the engine E is.

Specifically, as shown in FIGS. 6 and 7, in a state in which the engine E is in a cold state, the limit on the retarding side of the intake closing timing IVC of the relative rotation phase of the valve opening and closing timing control apparatus A is a cold start timing LSc, and in a state in which the engine E is in a high-temperature state, the limit on the retarding side of the intake closing timing IVC of the relative rotation phase of the valve opening and closing timing control apparatus A is a high-temperature start timing LSh.

For this reason, when the engine E in the cold state is started, the intake closing timing IVC is set in the advancing direction Sa relative to the cold start timing LSc as shown in FIG. 6. Also, when the engine E in the high-temperature state, as at a time immediately after stopping, is to be started, as shown in FIG. 7, the intake closing timing IVC is set in the advancing direction Sa relative to the high-temperature start timing LSh and is set in the retarding direction Sb relative to the cold start timing LSc.

Figure 8:
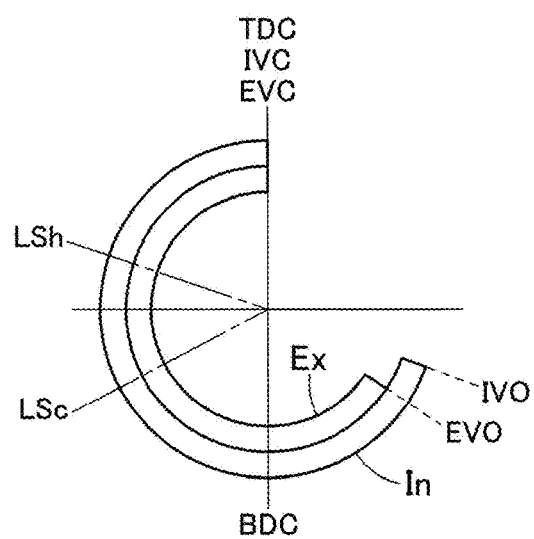
FIG. 8 is a timing diagram in which the intake valve is set to an ultra-retarded phase.

In particular, with this valve opening and closing timing control apparatus A, when the engine E is suspended, the relative rotation phase is set to an ultra-retarded phase shown in FIG. 8 by performing retarding control for significantly changing the relative rotation phase in the retarding direction Sb. With this ultra-retarded phase, the opening/closing timing is set such that the intake closing timing IVC matches the top dead center TDC. Note that the range in which the internal rotor 22 can rotate with respect to the driving case 21 is set such that this ultra-retarded phase can be set.

(Valve Opening/Closing Timing Control Apparatus: Overview of Phase Adjustment)

In phase adjustment using the valve opening and closing timing control apparatus A, the phase control unit 42 of the engine control apparatus 40 maintains the relative rotation phase between the driving case 21 and the internal rotor 22 by driving and rotating an output axis Ma of the phase control motor M at the same speed as the rotation speed of the intake camshaft 7 and in the same direction thereas.

Also, the phase control unit 42 changes the relative rotation phase in the advancing direction Sa or the retarding direction Sb by increasing or reducing the rotation speed of the phase control motor M using the rotation speed of the intake camshaft 7 as a reference.

In particular, since the valve opening and closing timing control apparatus A changes the relative rotation phase using the driving force of the phase control motor M, it is possible to operate at a higher speed compared to a configuration in which phase change is realized through hydraulic pressure, and it is possible to perform rapid setting to a needed relative rotation phase even in a state in which the hydraulic pressure is insufficient, as when the engine E is being started.

(Control Configuration)

As shown in FIG. 1, the engine control apparatus 40 receives input of detection signals from an accelerator pedal sensor 14, the shaft sensor 16, and the cam angle sensor 17, outputs control signals to the phase control motor M and the starter motor 15, and further outputs control signals to a combustion management unit 19 that controls the injector 9 and the spark plug 10.

The combustion management unit 19 manages operations of pumps and the like that supply fuel to the injector 9, and manages the ignition order and the ignition timing by controlling an ignition circuit that supplies power to the spark plug 10.

As described above, the engine control apparatus 40 includes the start control unit 41, the phase control unit 42, the suspension control unit 43, and the stop control unit 44. These are constituted as software, but portions thereof can also be constituted by hardware. In particular, the suspension control unit 43 executes suspension control for suspending the engine E, and retarding control for setting the relative rotation phase of the valve opening and closing timing control apparatus A to the ultra-retarded phase shown in FIG. 8.

The start control unit 41 performs cranking by controlling the starter motor 15, supplies fuel to the combustion chamber using the injector 9 through control of the combustion management unit 19 after the rotation speed of the crankshaft 1 exceeds a set value due to the cranking, and realizes starting of the engine E by performing ignition using the spark plug 10. With this start control unit 41, the relative rotation phase of the valve opening and closing timing control apparatus A is set to a relative rotation phase that is suitable for starting the engine E through control of the phase control motor M.

In a state in which the engine E is running, the phase control unit 42 controls the valve opening and closing timing control apparatus A and realizes intake of a needed amount of air by controlling the phase control motor M in order to intake air at an optimal intake timing in the combustion chamber based on information such as the depression amount of the accelerator pedal detected by the accelerator pedal sensor 14, the load acting on the engine E, and the rotation speed of the crankshaft 1.

When phase control is to be performed by the phase control unit 42, feedback control is performed in which the target phase is set, the relative rotation phase of the valve opening and closing timing control apparatus A is acquired based on the detection results of the shaft sensor 16 and the cam angle sensor 17, and the deviation between the relative rotation phase and the target phase is reduced.

When combustion in at least some of the combustion chambers of the engine E is to be suspended, the suspension control unit 43 realizes suspending (temporary stopping) of the engine E by stopping the supply of fuel by the injector 9 through control of the combustion management unit 19, and stopping ignition by the spark plug 10. This suspending will be described simply as "suspending of the engine E". As a specific control mode of the suspension control unit 43, the control mode is set such that suspending of the engine E is performed when depression of the accelerator pedal is removed.

The stop control unit 44 realizes a complete stop of the engine E by stopping the supply of fuel by the injector 9 and stopping ignition by the spark plug 10 through control of the combustion management unit 19 when the combustion in the combustion chamber is to be stopped.

(Problem to be Solved in Suspension Control)

As described above, in the engine control apparatus 40, the suspension control unit 43 executes suspension control when it is determined that a depression operation on the accelerator pedal has been removed based on the signal from the accelerator pedal sensor 14. Even in a state in which the suspension control is executed in this manner, the vehicle body travels due to inertia, and therefore the crankshaft 1 rotates due to the rotation force of the wheels. In a state in which the engine E is to be suspended in this manner, if the crankshaft 1 is rotating, with the conventional engine E, air is taken into the combustion chamber, and the air is thereafter discharged from the combustion chamber.

In this manner, with the conventional engine E, in the state in which the engine E is suspended, as a result of the air discharged from the combustion chamber coming into contact with the catalyst 13, not only is the temperature of the catalyst 13 reduced, but the purification performance is reduced due to oxygen included in the air being adsorbed onto the catalyst.

In order to resolve this inconvenience, in the engine control apparatus 40, when the suspension control for suspending the engine E is executed, the valve opening and closing timing control apparatus A is changed to the ultra-retarded phase shown in FIG. 8 by executing the above-described retarding control in parallel, thus enabling control according to which air is hardly discharged at all from the combustion chamber to the exhaust path.

(Control Mode)

Figure 9:
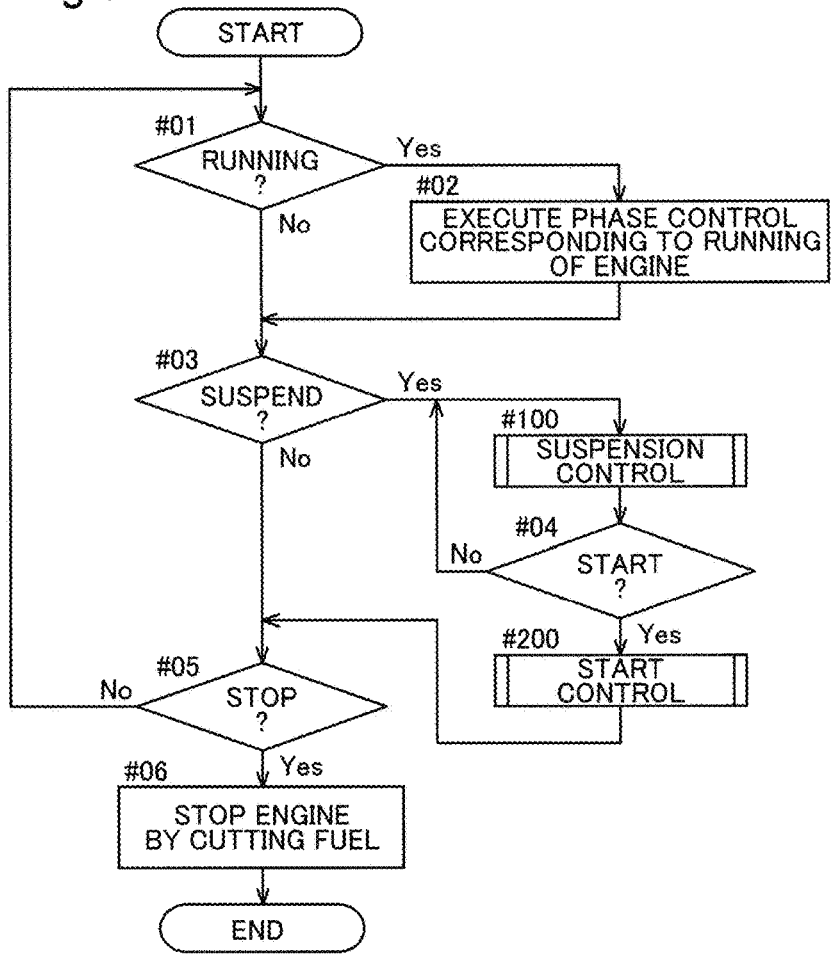
FIG. 9 is a flowchart showing a control mode for an opening/closing timing of an intake valve.

A control mode of the engine E performed by the engine control apparatus 40 is shown in the flowchart of FIG. 9, and timing diagrams related thereto are shown in FIGS. 6 to 8. Note that the flowchart shown in FIG. 9 shows a flow of control performed in a state in which the engine E has already been started.

That is, in a state in which the engine E is running, the phase control unit 42 executes phase control in which the relative rotation phase of the valve opening and closing timing control apparatus A is set to a phase corresponding to the running of the engine E (steps #01 and #02).

With this control, the engine control apparatus 40 acquires information such as the load acting on the engine E, the rotation speed of the engine E (number of rotations per unit time), and the depression amount of the accelerator pedal. Also, based on these pieces of information, control is executed in which the phase control unit 42 sets the relative rotation phase that is optimal for allowing the engine E to run to a target phase, and the phase control motor M is driven until the actual relative rotation phase detected based on the shaft sensor 16 and the cam angle sensor 17 reaches the target phase. In this phase control, the relative rotation phase is set such that the valve opening and closing timing control apparatus A is included in the range of relative rotation phases shown in FIGS. 6 and 7.

Also, if it is determined that the depression of the accelerator pedal has been removed as described above according to a signal from the accelerator pedal sensor 14, the suspension control unit 43 suspends the engine E through suspension control (steps #03 and #100), and thereafter, if it is determined that the accelerator pedal has been depressed, the start control unit 41 executes start control of the engine E (steps #04 and #200). In this flowchart, the suspension control (step #100) and the start control (step #200) are shown as sub-routines.

Also, when the engine E is to be stopped, the stop control unit 44 performs fuel cutting (stopping of the supply of fuel to the combustion chamber) and stops ignition, thereby stopping the engine E (steps #05 and #06). Accordingly, the stopping of the engine E is realized.

Figure 10:
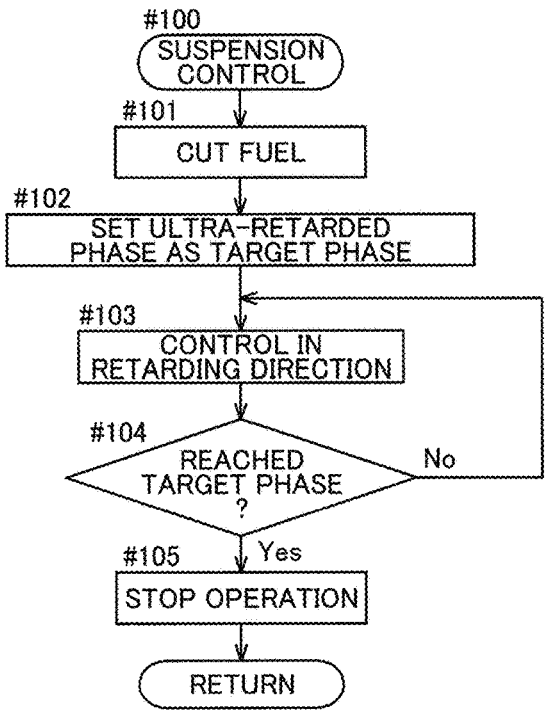
FIG. 10 is a flowchart for suspension control.

As shown in FIG. 10, in the suspension control (step #100), the suspension control unit 43 performs fuel cutting (stopping of the supply of fuel to the combustion chamber), stops ignition, and sets the ultra-retarded phase as the target phase of the valve opening and closing timing control apparatus A (steps #101 and #102). Also, control for changing the relative rotation phase in the retarding direction Sb through control of the phase control motor M is started, and control is stopped at a time when the relative rotation phase reaches the target phase (steps #103 to #105).

In this flowchart, step #103 is a specific example of retarding control, and in a state in which the valve opening and closing timing control apparatus A reaches the ultra-retarded phase shown in FIG. 8 and stops, the intake closing timing IVC of the intake valve Va matches the top dead center TDC. This ultra-retarded phase is a phase in which the exhaust opening timing EVO is a timing that exceeds the high-temperature start timing LSh on the retarding side, starting of the engine E is not possible, and autonomous running of the engine E is not possible even if supply and ignition of the fuel are performed. Note that at this ultra-retarded phase, the intake closing timing IVC of the intake valve Va does not necessarily match the top dead center TDC, and the ultra-retarded phase need only be a phase in which starting of the engine E is not possible, and autonomous running of the engine E is not possible even if supply and ignition of the fuel are performed.

Also, even in a state in which the engine E is suspended, the vehicle body travels by inertia, and therefore the piston 4 acts due to the driving force transmitted from the wheels. However, the relative rotation phase of the valve opening and closing timing control apparatus A is set to the ultra-retarded phase through the suspension control (step #100), and therefore the air is not compressed in the combustion chamber, and the air is not discharged from the combustion chamber even if the exhaust valve Vb reaches the open state. Accordingly, a temperature decrease is not incurred in the catalyst 13 and the oxygen in the air is not adsorbed onto the catalyst 13.

Figure 11:
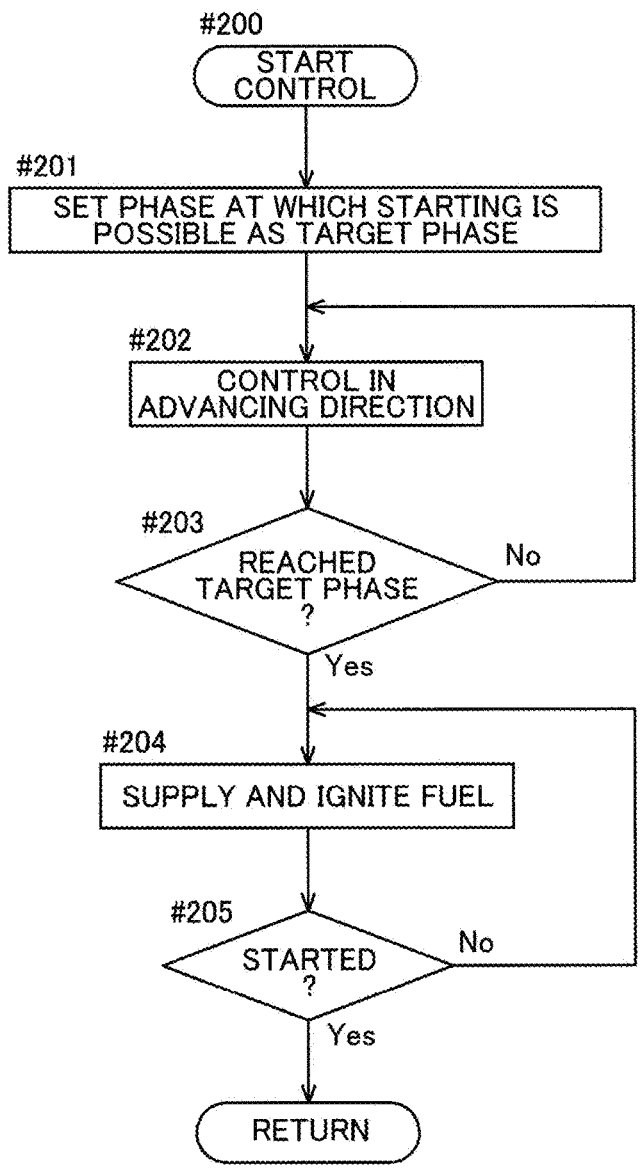
FIG. 11 is a flowchart for start control.

In the start control (step #200), as shown in FIG. 11, the relative rotation phase of the valve opening and closing timing control apparatus A is set to a target phase at which starting of the engine E is possible (steps #201 and #202). Thereafter, control for changing the relative rotation phase in the advancing direction Sa through control of the phase control motor M is started, fuel is supplied to the combustion chamber by the injector 9 at the time when the relative rotation phase reaches the target phase, ignition by the spark plug 10 is performed, and after starting of the engine E is confirmed, the control ends (steps #203 to #205).

The start control of step #200 is executed by the start control unit 41 of the engine control apparatus 40. When this start control is to be executed, for example, the control mode can also be set such that the target phase is set based on the temperature of the engine E, and the phase control motor M is driven so as to reach the target phase.

(Operations and Effects of First Embodiment)

In this manner, the valve opening and closing timing control apparatus A is configured to be able to perform setting to the ultra-retarded phase shown in FIG. 8, exceeding the normal range of phase control shown in FIGS. 6 and 7. In addition to this mechanical configuration, the engine control apparatus 40 is constituted such that when the engine E is to be suspended, control for setting the relative rotation phase to the ultra-retarded phase is performed.

Accordingly, if the engine E is suspended, the crankshaft 1 rotates due to the driving force transmitted from the wheels, and even if an operation of opening and closing the intake valve Va and the exhaust valve Vb accompanying this rotation is performed, an operation is enabled in which the timing of opening and closing the intake valve Va is significantly retarded. By setting the opening/closing timing of the intake valve Va in this manner, the intake valve Va can be kept in the open state until immediately before the piston 4 reaches the top dead center TDC (compression top dead center), and the combustion chamber air is not compressed in the combustion chamber.

Accordingly, even if the exhaust valve Vb opens thereafter, the air is not discharged from the combustion chamber, the air does not flow from the exhaust manifold 12 to the exhaust path, a decrease in the temperature of the catalyst 13 is not incurred, and a decrease in the performance of the catalyst is not incurred due to the air coming into contact with the catalyst 13.

Also, as shown in the flowchart in FIG. 10, in suspension control, retarding control for changing the relative rotation phase in the retarding direction Sb is performed immediately after the fuel is cut, and therefore misfiring is not incurred as in the case where retarding control is performed in a state in which mixed air remains in the combustion chamber.

Hereinafter, a second embodiment of the present invention will be described with reference to the drawings.

(Basic Configuration)

Figure 12:
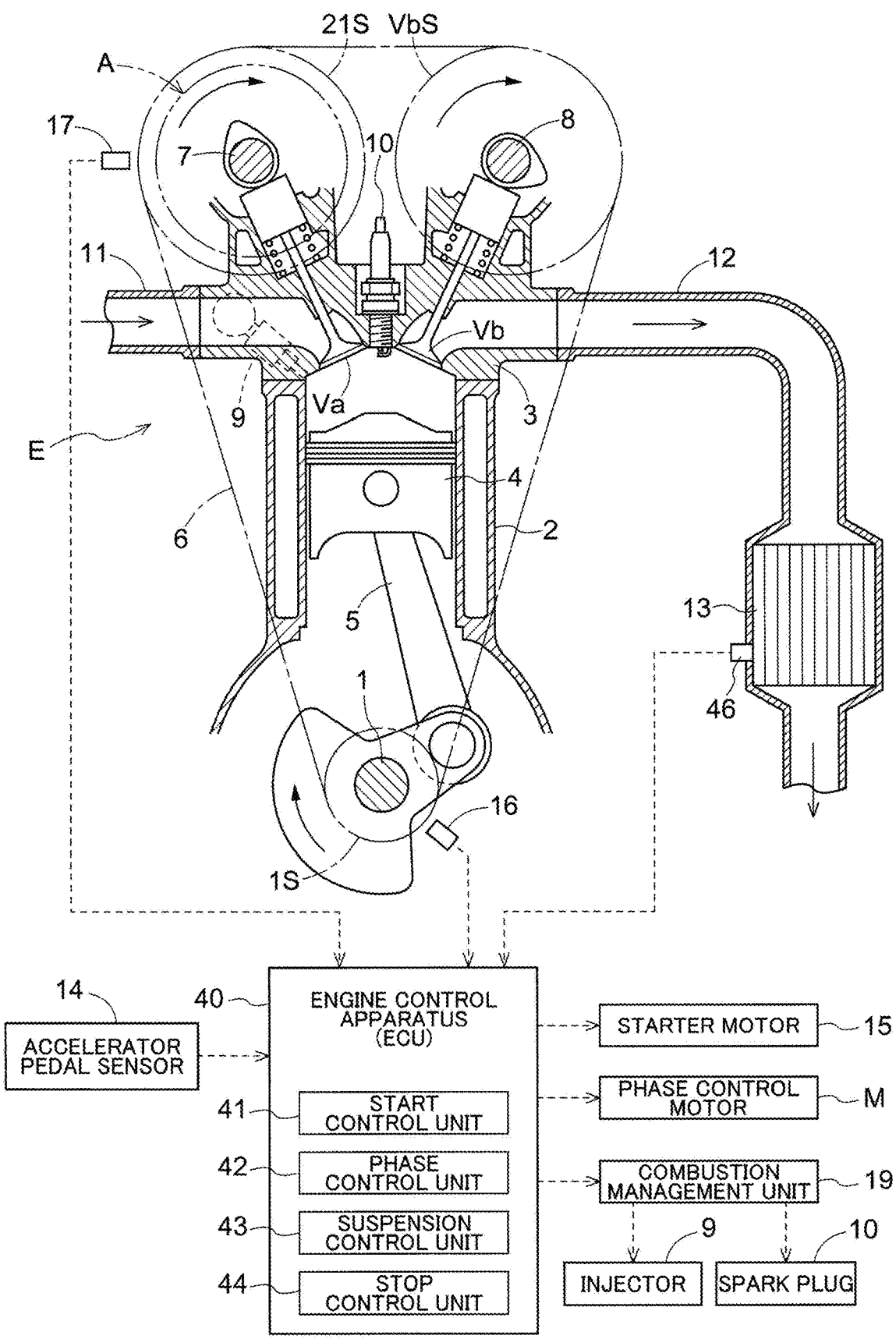
FIG. 12 is a diagram showing a cross section of an engine and a control unit of a second embodiment.

In the second embodiment, the configuration of the engine E (one example of an internal combustion engine), the configuration of the valve opening and closing timing control apparatus A, and the configuration of the engine control apparatus 40 are basically the same as in the first embodiment, but as shown in FIG. 12, the second embodiment differs from the first embodiment in that a catalyst temperature sensor 46 serving as a catalyst temperature acquisition unit for acquiring the temperature of the catalyst 13 is included.

Although FIG. 12 shows a configuration in which the catalyst temperature sensor 46 is included at a position in contact with the catalyst 13, for example, it is also possible to employ a configuration in which two temperature sensors that acquire the temperatures of upstream and downstream exhaust gas of the catalyst 13 are included, and the temperature of the catalyst 13 is estimated based on the difference in temperature of these temperature sensors. Alternatively, it is also possible to employ a configuration or the like in which an exhaust gas temperature sensor for acquiring the temperature of the exhaust gas of the engine E is included instead of the catalyst temperature sensor 46 and the temperature of the catalyst 13 is estimated by correcting the acquired value of the exhaust gas temperature sensor using a parameter such as the outside temperature and the running time of the engine E.

(Control of Valve Opening/Closing Timing Control Apparatus Accompanying Suspension Control)

Figure 13:
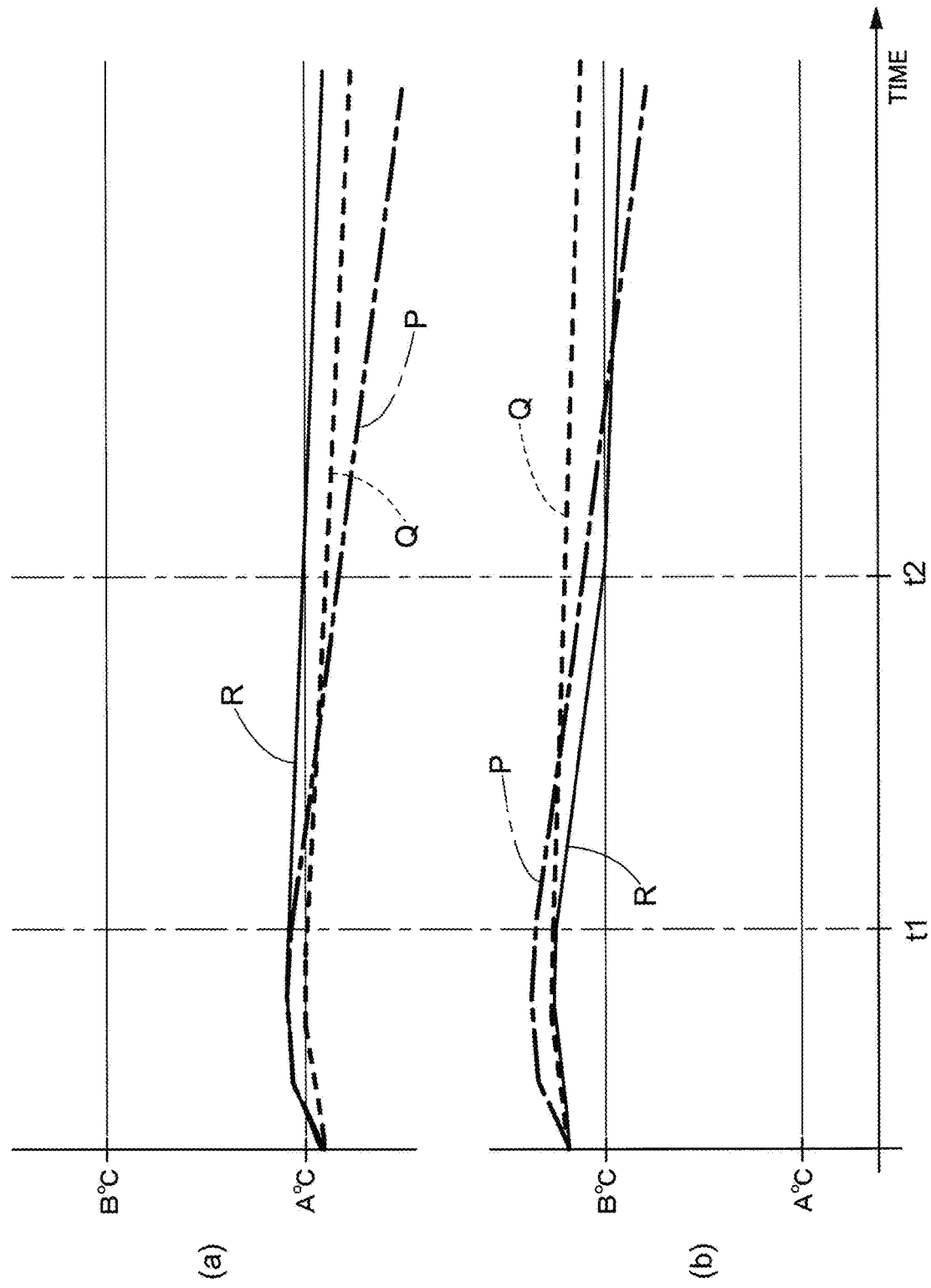
FIG. 13 is a diagram showing a change in the temperature of a catalyst accompanying control in suspension control.

In the present embodiment, a catalyst that is kept in an active state in the temperature range from A° C. (one example of a first set temperature) to B° C. (one example of a second set temperature) and realizes optimal purification of the exhaust gas is used as the catalyst 13. In FIG. 13, the lower-limit temperature at which the active state is maintained is indicated as an active lower-limit line A° C., and the upper-limit temperature at which the active state is maintained is indicated as the active upper-limit line B° C. For example, A° C. is 350° C., and B° C. is 400° C. If air is supplied immediately after the engine E is suspended, the temperature of the catalyst 13 rises due to the heat of reaction of the oxygen included in the air. In contrast to this, a phenomenon is recognized in which if the air is not supplied immediately after the engine E is suspended and the oxygen is blocked, the catalyst 13 incurs a temperature decrease.

Figure 14:
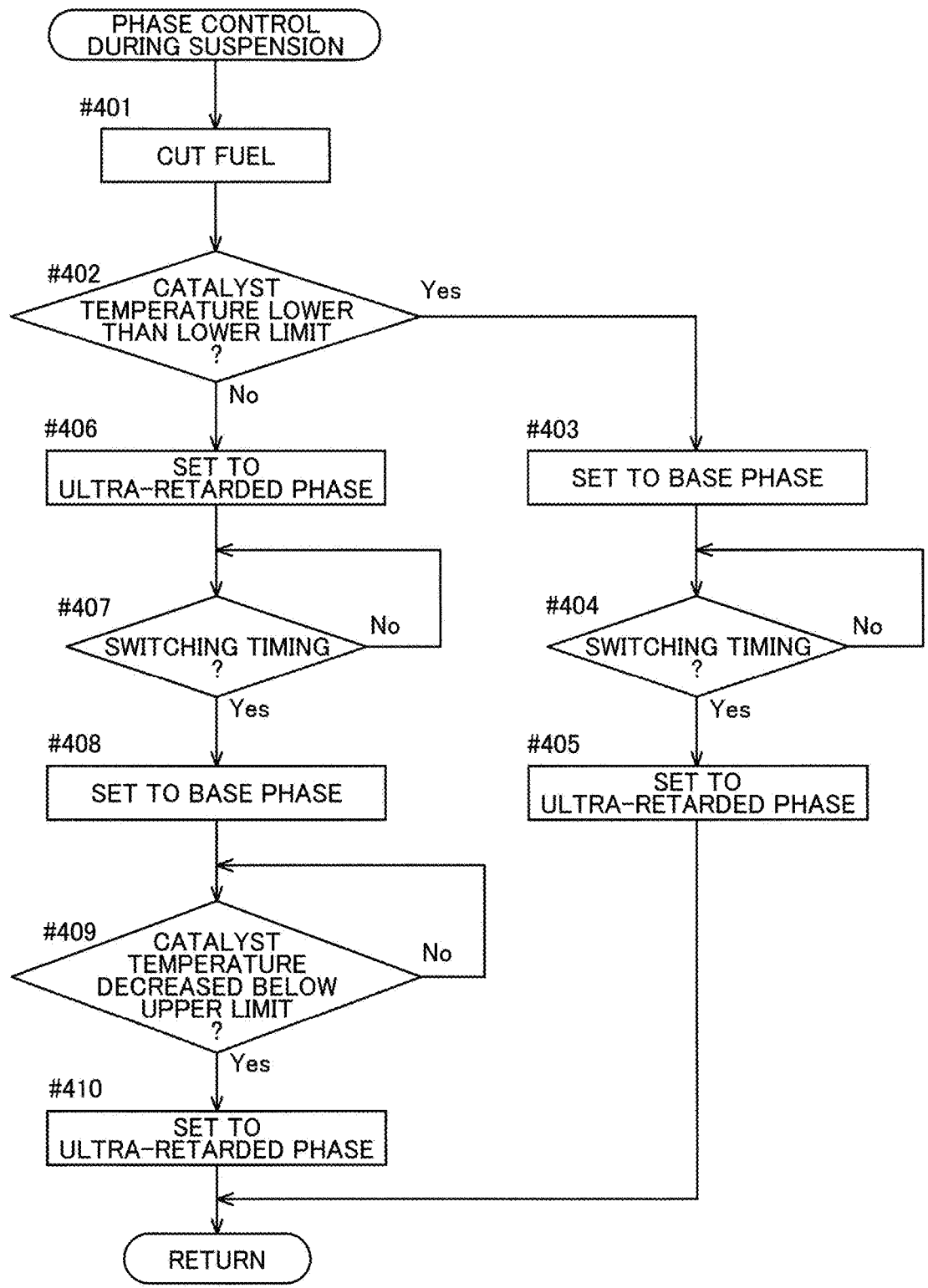
FIG. 14 is a flowchart for phase control during suspension.

FIG. 13 shows changes in the temperature of the catalyst 13 acquired by the catalyst temperature sensor 46 when, for example, the phase control during suspension shown in the flowchart in FIG. 14 is executed in a state in which the crankshaft 1 rotates accompanying the rotation of the wheels immediately after the engine E is suspended due to fuel cutting.

That is, FIG. 13(*a*) on the upper side shows changes in temperature of the catalyst 13 in control performed when the temperature acquired by the catalyst temperature sensor 46 is a temperature lower than the active lower-limit line A° C. FIG. 13(*b*) on the lower side shows changes in temperature of the catalyst 13 in control performed when the temperature acquired by the catalyst temperature sensor 46 is a temperature higher than the active upper-limit line B° C.

In FIGS. 13(*a*) and 13(*b*), the temperature change that occurs when the valve opening and closing timing control apparatus A is set to an intake control phase (a phase that does not include the ultra-retarded phase) is indicated as a base graph P by a one-dot chain line, the temperature change that occurs when set to the ultra-retarded phase is indicated by a broken line as an ultra-retarded graph Q, and temperature change obtained by combining the base graph P and the ultra-retarded graph Q is indicated as an composite graph R using a solid line.

The phase control during suspend shown in the flowchart in FIG. 14 is executed by the suspension control unit 43 of the engine control apparatus 40. That is, if the temperature acquired by the catalyst temperature sensor 46 at the timing of executing suspension control for suspending the operation of the engine E through fuel cutting is lower than the active lower-limit line A° C. (one example of a lower limit) as shown in FIG. 13(*a*), in order to raise the temperature of the catalyst 13, the suspension control unit 43 sets the valve opening and closing timing control apparatus A to a base phase (a phase that does not include the ultra-retarded phase) (steps #401 to #403).

Since this control envisions a state in which the crankshaft 1 rotates, the air discharged from the combustion chamber of the engine E is supplied to the catalyst 13 accompanying the rotation of the crankshaft 1 due to the relative rotation phase of the valve opening and closing timing control apparatus A being set to the base phase. Due to this supply, heat of reaction occurs due to the oxygen included in the air reacting with the catalyst 13, and in the composite graph R shown in FIG. 13(*a*), the temperature changes similarly to the base graph P up to a first timing t1, and a temperature increase of the catalyst 13 is enabled.

There is a limit to the temperature increase of the catalyst 13 due to the reaction with the oxygen, and after the limit is reached, heat dissipation is started due to the supplied air (see the base graph P of FIG. 13(*a*)). In order to suppress a decrease in the temperature resulting from this heat dissipation, retarding control is executed at a switching timing (first timing t1 in FIG. 13) at which temperature decrease is started due to heat dissipation, and the suspension control unit 43 sets the relative rotation phase of the valve opening and closing timing control apparatus A to the ultra-retarded phase (steps #404 and #405). Accordingly, in the composite graph R, the temperature decreases with the same trend as in the ultra-retarded graph Q from the first timing t1 and onward.

That is, the temperature change shown in FIG. 13(*a*) as the composite graph R overlaps with the base graph P as described above since the relative rotation phase of the valve opening and closing timing control apparatus A is set to the base phase until the first timing t1 is reached. Thereafter, in the composite graph R, the temperature changes with a trend parallel to that of the ultra-retarded graph Q since the relative rotation phase is set to the ultra-retarded phase after the first timing t1 is reached.

In this manner, due to the control of steps #403 to #405 being performed, the temperature of the catalyst 13 changes as shown in the composite graph R in FIG. 13(*a*), and not only is a rise in the temperature of the catalyst 13 made possible, but heat dissipation that occurs after the temperature rise is suppressed. As a result, the temperature rise of the catalyst 13 is achieved, and by suppressing heat dissipation thereafter, it is possible to favorably purify the exhaust gas with the catalyst 13 kept in the active state or a state near being active.

The first timing t1 can be set based on the temperature acquired by the catalyst temperature sensor 46, and the valve opening and closing timing control apparatus A can also be set based on the amount of time that has elapsed (a count using a timer, etc.) after being set to the base phase.

Also, if the temperature acquired by the catalyst temperature sensor 46 at the timing of executing the suspension control for suspending the operation of the engine E through fuel cutting is higher than the active upper-limit line B° C. (one example of an upper limit) as shown in FIG. 13(*b*) (also includes the case of being equal), the valve opening and closing timing control apparatus A is set to the ultra-retarded phase through retarding control in order to reduce the temperature of the catalyst 13 (steps #401, #402, and #406).

Since this control envisions a state in which the crankshaft 1 rotates accompanying the rotation of the wheels, even if the crankshaft 1 rotates, hardly any air is supplied from the combustion chamber of the engine E to the catalyst 13 due to the relative rotation phase of the valve opening and closing timing control apparatus A being set to the ultra-retarded phase. As shown in the composite graph R (overlaps with the ultra-retarded graph Q until the first timing t1) in FIG. 13(*b*), the temperature of the catalyst 13 rises slightly due to coming into contact with a small amount of air.

In this control as well, there is a limit to the temperature rise of the catalyst 13 resulting from the reaction with the oxygen, and after the limit is reached, the relative rotation phase of the valve opening and closing timing control apparatus A is set to the base phase at the switching timing (first timing t1 in FIG. 13) at which the temperature decrease is started, and thereby the temperature decrease of the catalyst 13 is prompted by the air supplied to the catalyst 13 (steps #407 and #408). Accordingly, in the composite graph R of FIG. 13(b), the temperature decreases with the same trend as in the base graph P at the first timing t1 and onward.

Although timings that are equal are shown as the first timings t1 of FIGS. 13(a) and 13(b), it is also possible to use timings that are different. Also, the first timing t1 can be set based on the temperature acquired by the catalyst temperature sensor 46, and the relative rotation phase of the valve opening and closing timing control apparatus A can also be set based on the amount of time that has elapsed (a count using a timer, etc.) after being set to the base phase.

Next, temperature decrease is prompted, and supply of air is suppressed by once again setting the relative rotation phase of the valve opening and closing timing control apparatus A to the ultra-retarded phase through retarding control at a second timing t2 at which the temperature acquired by the catalyst temperature sensor 46 decreases to the active upper limit line B° C. (steps #409 and #410). At this second timing t2 and onward, in the composite graph R, the temperature slightly decreases with the same trend as in the ultra-retarded graph Q.

The temperature change shown as the composite graph R in FIG. 13(b) overlaps with the ultra-retarded graph Q as described above since the relative rotation phase of the valve opening and closing timing control apparatus A is set to the ultra-retarded phase until reaching the first timing t1. In the composite graph R, the temperature decreases with a trend parallel to that of the base graph P since the relative rotation phase is set to the base phase after reaching the first timing t1, and furthermore, temperature change in which a rapid temperature decrease is suppressed is shown since the relative rotation phase is once again set to the ultra-retarded phase at the second timing t2.

That is, by performing the control shown in steps #406 to #410, the temperature of the catalyst 13 changes as shown in the composite graph R, the temperature decrease of the catalyst 13 is enabled, and a phenomenon in which the temperature decreases below the active upper-limit line B° C. is suppressed after the temperature decrease. As a result, not only is the temperature decrease of the catalyst 13 realized, but the phenomenon in which the temperature decreases below the active upper-limit line B° C. is suppressed, the temperature of the catalyst 13 is kept in the active state or a state near being active, and favorable purification of the exhaust gas is enabled.

The flowchart shown in FIG. 14 shows an overview of phase control during suspension, and if information for starting the engine E is acquired at any timing during the flow of this control, control is performed in which the phase control during suspension is stopped, the relative rotation phase of the valve opening and closing timing control apparatus A is changed in the advancing direction, and thereby the engine E is started after changing the relative rotation phase to a phase suitable for starting the engine E.

(Operations and Effects of Second Embodiment)

In this manner, when the engine E is suspended, the suspension control unit 43 determines whether or not the retarding control of the valve opening and closing timing control apparatus A is needed based on the temperature of the catalyst 13. That is, based on the temperature of the catalyst 13 acquired by the catalyst temperature sensor 46, for example, the valve opening and closing timing control apparatus A is set to the ultra-retarded phase, whereby the amount of air supplied to the catalyst 13 is significantly reduced and the temperature of the catalyst 13 is maintained, or the valve opening and closing timing control apparatus A is set to the base phase, and thereby the oxygen included in the air is used to enable a temperature increase in the catalyst 13.

Also, in the phase control during suspension, control for switching the relative rotation phase of the valve opening and closing timing control apparatus A to the ultra-retarded phase and the base phase is performed, and thereby even if the temperature of the catalyst 13 is lower than the active lower-limit line A° C. (one example of a lower limit) or is higher than the active upper-limit line B° C. (one example of an upper limit), the temperature is managed as in the graph shown as the composite graph R in the chart shown in FIG. 13 and the catalyst 13 is kept in the active state, or is kept in a state near being active, and the processing of the exhaust gas can be performed favorably.

Hereinafter, a third embodiment of the present invention will be described with reference to the drawings.

(Basic Configuration)

Figure 15:
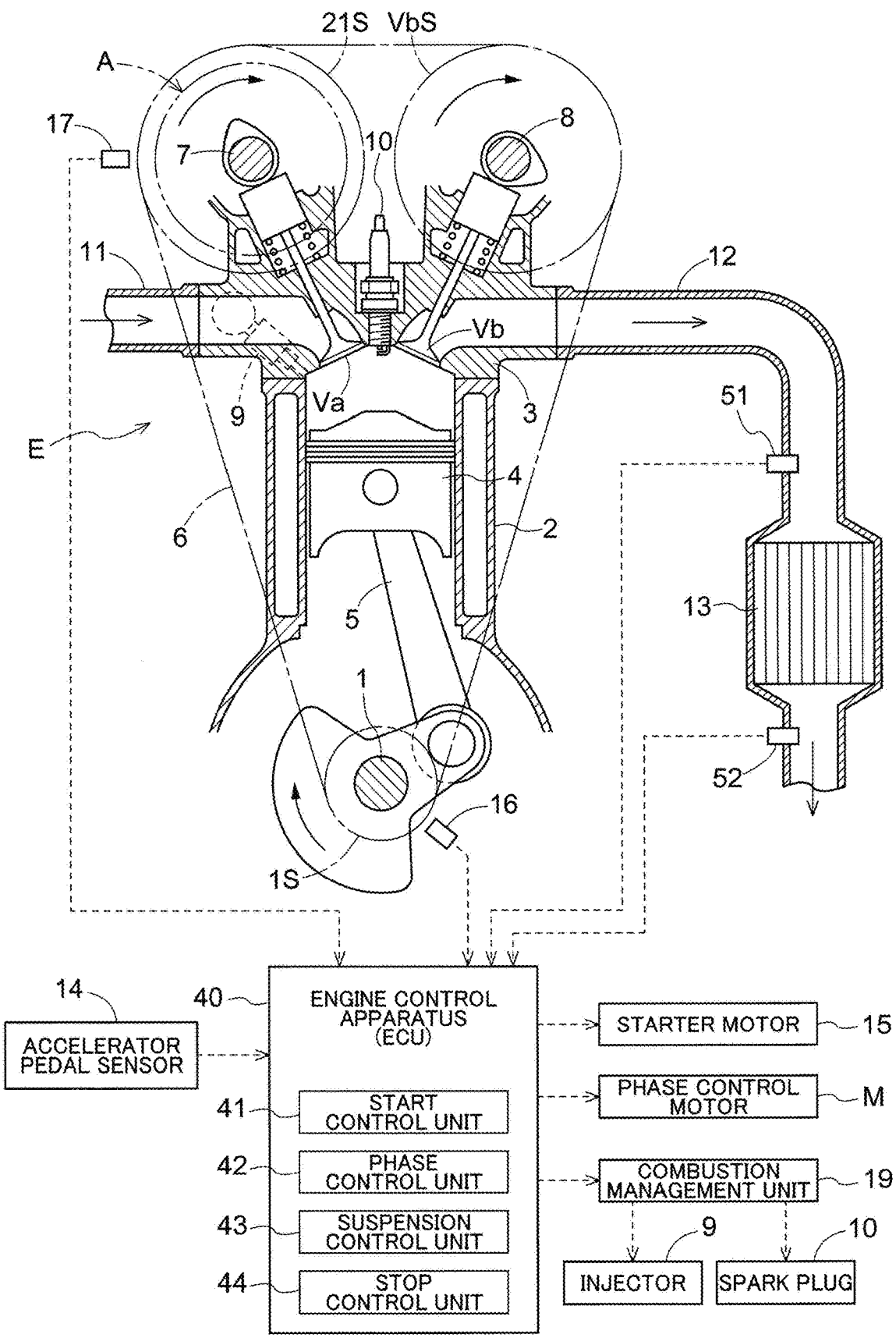
FIG. 15 is a diagram showing a cross section of an engine and a control unit of a third embodiment.

In the third embodiment, the configuration of the engine E (one example of an internal combustion engine), the configuration of the valve opening and closing timing control apparatus A, and the configuration of the engine control apparatus 40 are basically the same as in the first embodiment, but the third embodiment differs from the first embodiment in that the catalyst 13 is configured to be able to hold oxygen by carrying an oxygen storage agent in a catalyst support, and as shown in FIG. 15, the catalyst 13 includes a first oxygen concentration sensor 51 and a second oxygen concentration sensor 52 serving as oxygen concentration acquisition units that acquire oxygen concentrations included in the catalyst 13.

In FIG. 15, the first oxygen concentration sensor 51 is arranged on the upstream side of the catalyst 13 on the exhaust gas path on which the exhaust gas from the exhaust manifold 12 is supplied to the catalyst 13, and the second oxygen concentration sensor 52 is arranged on the downstream side of the catalyst 13. These two oxygen concentration sensors function as exhaust gas air-fuel ratio sensors, and are used to estimate the amount of oxygen held in the catalyst 13 based on the acquired values in the two oxygen concentration sensors.

The catalyst 13 has a function (oxygen storage function) of holding oxygen if the concentration of oxygen included in the exhaust gas increases, and keeps the atmosphere of the catalyst 13 near a theoretical air-fuel ratio by providing oxygen if the concentration of oxygen included in the exhaust gas decreases.

Note that the catalyst 13 functions such that due to the oxygen storage agent being held in the catalyst support, if the oxygen concentration of the exhaust gas increases as at a time when combustion in the combustion chamber is performed on the lean side, the oxygen is held in the oxygen storage agent, and if the oxygen concentration of the exhaust gas decreases as at a time when the combustion in the combustion chamber is performed on the rich side, the oxygen that is already held in the oxygen storage agent is provided to the exhaust gas.

(Control of Valve Opening/Closing Timing Control Apparatus Accompanying Suspension Control)

If there is a sufficient amount of oxygen that is held (if the oxygen is saturated) at the timing at which the engine E is suspended, the catalyst 13 does not need to subsequently supply air. Also, if the held oxygen is not sufficient at the timing at which the engine E is suspended, it is preferable that the catalyst 13 achieves an increase in the amount of oxygen that is held by subsequently supplying the air.

Figure 16:
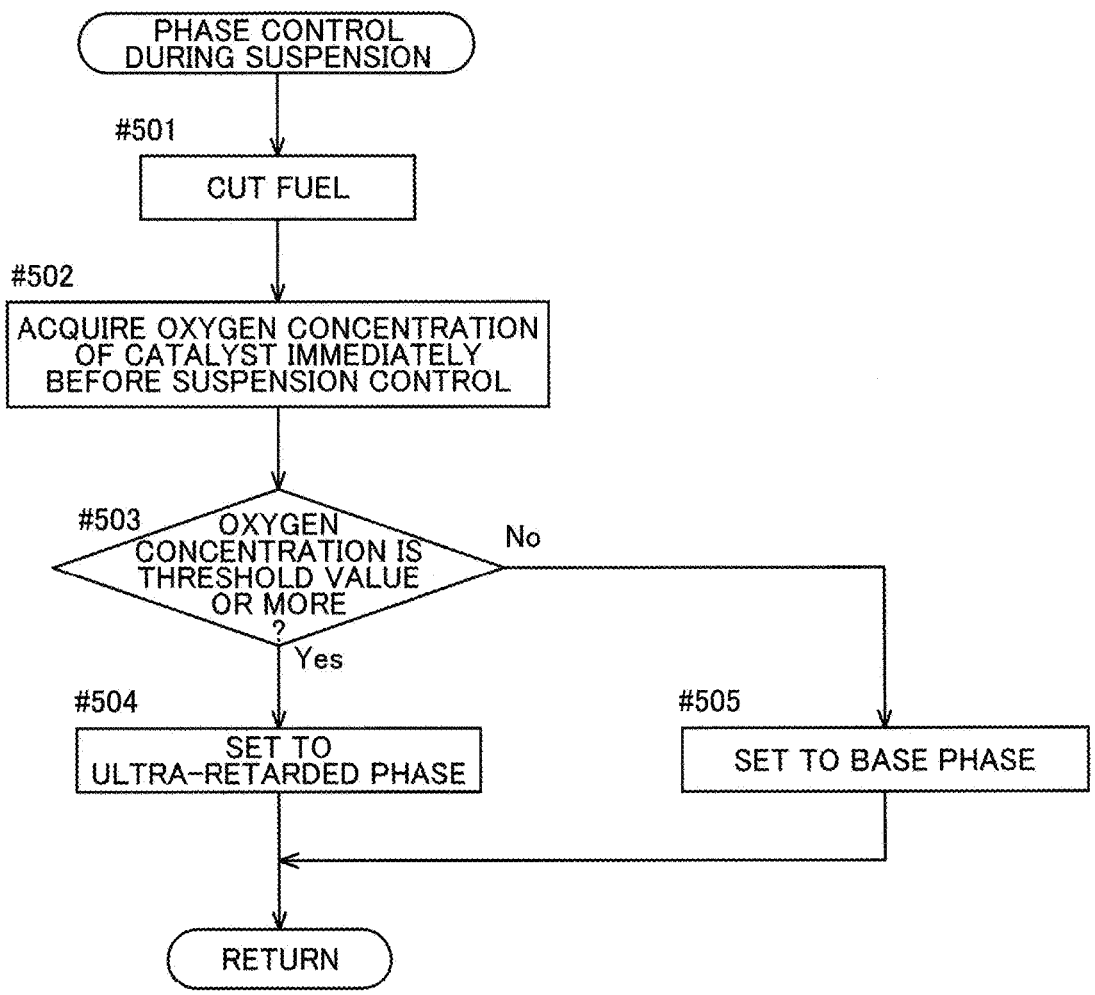
FIG. 16 is a flowchart for phase control during suspension.

For this reason, phase control during suspension shown in the flowchart of FIG. 16 is executed. That is, when the engine E is suspended through fuel cutting, the first oxygen concentration sensor 51 and the second oxygen concentration sensor 52 acquire the oxygen concentration of the catalyst 13 immediately before the suspension control (steps #501 and #502).

Control for acquiring an oxygen concentration is performed by the engine control apparatus 40 acquiring detection signals from the first oxygen concentration sensor 51 and the second oxygen concentration sensor 52 at relatively short intervals in a state in which the engine E is running. To give one example of this control mode, it is conceivable that the amount of oxygen held in the catalyst 13 reaches a pre-set upper limit and enters a saturated state if the combustion in the combustion chamber is on the rich side based on the detection signal of the first oxygen concentration sensor 51, the accelerator operation amount is not changed, and the detection signals of the first oxygen concentration sensor 51 and the second oxygen concentration sensor 52 do not vary.

In contrast to this, if an accelerator operation is performed, it is determined that the combustion in the combustion chamber is on the rich side based on the detection signal of the first oxygen concentration sensor 51, and a decrease in the oxygen concentration is recognized based on the detection signal of the second oxygen concentration sensor 52 thereafter, the oxygen inside of the catalyst 13 is consumed and a decrease in the amount of oxygen held in the catalyst 13 is expected.

In the engine control apparatus 40, estimation of the oxygen concentration of the catalyst 13 is made possible through processing such as referencing a table based on the change trend and the change time in the acquired signals of the first oxygen concentration sensor 51 and the second oxygen concentration sensor 52, and the flow rate of the exhaust gas.

With this control, a threshold value (one example of a set concentration value) is set between the upper limit and the lower limit of the concentration of the oxygen held in the catalyst 13. If the oxygen concentration of the catalyst 13 is the threshold value or more, the suspension control unit 43 sets the relative rotation phase of the valve opening and closing timing control apparatus A to the ultra-retarded phase through retarding control, and thus the supply of air is suppressed (steps #503 and #504). Also, if the oxygen concentration of the catalyst 13 is less than the threshold value, the relative rotation phase is set to the base phase (steps #503 and #505).

In particular, the determination that the oxygen concentration is the threshold value or more (Yes in step #503) is one example of a determination performed when the oxygen concentration is a set concentration value or more, and the determination that the oxygen concentration is less than the threshold value (No in step #503) is one example of a determination that the oxygen concentration is the set concentration value or more.

Note that as another embodiment of this control, it is also conceivable that control is performed in which the value of the upper limit and the value of the lower limit of the oxygen concentration of the catalyst 13 are set in advance, and the air is not supplied within the range of the value of the upper limit and the value of the lower limit. With this other embodiment, it is also conceivable that the control mode is set such that selection of the ultra-retarded phase and the base phase can be performed by setting the value of the lower limit to the set concentration value.

(Operations and Effects of Third Embodiment)

In this manner, when the engine E is to be suspended, the suspension control unit 43 determines whether or not the retarding control of the valve opening and closing timing control apparatus A is needed based on the acquired values of the first oxygen concentration sensor 51 and the second oxygen concentration sensor 52. That is, the oxygen concentration of the catalyst 13 is acquired based on the acquired values of the first oxygen concentration sensor 51 and the second oxygen concentration sensor 52, and it is possible to select a case in which the retarding control is performed and a case in which the retarding control is not performed based on the acquired values and the threshold value.

With this control, a state in which the crankshaft 1 rotates accompanying the rotation of the wheels is envisioned, and therefore if the relative rotation phase of the valve opening and closing timing control apparatus A is set to the ultra-retarded phase, hardly any air is supplied from the combustion chamber of the engine E to the catalyst 13 even if the crankshaft 1 rotates. Accordingly, air is not needlessly brought into contact with the catalyst 13, and a load does not act on the rotation of the wheels.

Also, if the relative rotation phase of the valve opening and closing timing control apparatus A is set to the base phase (a phase not including the ultra-retarded phase), the air that has passed through the combustion chamber when the crankshaft 1 rotates can be supplied to the catalyst 13, the oxygen concentration held in the catalyst 13 can be raised, and the oxygen concentration of the catalyst 13 can be increased, and thereafter, if the engine E is started, optimal purification of the exhaust gas is realized.

With this third embodiment, after the relative rotation phase of the valve opening and closing timing control apparatus A is set based on the oxygen concentration of the catalyst 13 as shown in steps #503 to #505 of the flow chart in FIG. 16, the relative rotation phase is fixed, but it is also possible to set the control mode such that, for example, after being set to the base phase, for example, if the integrated value of the number of rotations of the crankshaft 1 reaches a set value, the ultra-retarded phase is switched to.

Hereinafter, a fourth embodiment of the present invention will be described with reference to the drawings.

(Basic Configuration)

In the fourth embodiment, the configuration of the engine E (one example of an internal combustion engine), the configuration of the valve opening and closing timing control apparatus A, and the configuration of the engine control apparatus 40 are basically the same as in the first embodiment.

As shown in FIGS. 1 and 2, the engine E has multiple (four in the embodiment) cylinders, and has pistons 4 that are accommodated in multiple combustion chambers, an injector 9 that injects fuel into the multiple combustion chambers, and a spark plug 10 that ignites the mixed air in the combustion chambers.

Also, the identification numbers are set with the cylinder on the left end of the drawing among the multiple cylinders shown in FIG. 2 being first, and second, third, and fourth are set rightward from the first, and for example, control in which the fuel is supplied and the fuel is ignited in the cylinders in the order first, third, fourth, and second is conceivable.

As described before in the first embodiment, in the control for suspending the engine E (suspension control), retarding control is performed in which the suspension control unit 43 performs fuel cutting (stopping of the supply of fuel to the combustion chamber) and significantly changes the relative rotation phase of the valve opening and closing timing control apparatus A in the retarding direction Sb.

Here, it is conceivable that the timing at which the suspension control unit 43 executes suspension control is set to, for example, after combustion in a pre-set cylinder (cylinder in which a specific identification number is set) ends. However, although the control is simple, this kind of setting leads to an inconvenience in which the fuel is needlessly consumed due to the fact that a predetermined amount of time is needed until the engine E suspends after the engine control apparatus 40 including the suspension control unit 43 acquires the suspension command information.

Also, the catalyst 13 has a property of deteriorating and eroding due to the oxygen included in the air coming into contact therewith. For this reason, when the engine E is to be suspended, it is desired that the amount of oxygen supplied to the catalyst 13 is reduced by rapidly transitioning to the suspended state after the suspension command information is acquired.

Figure 17:
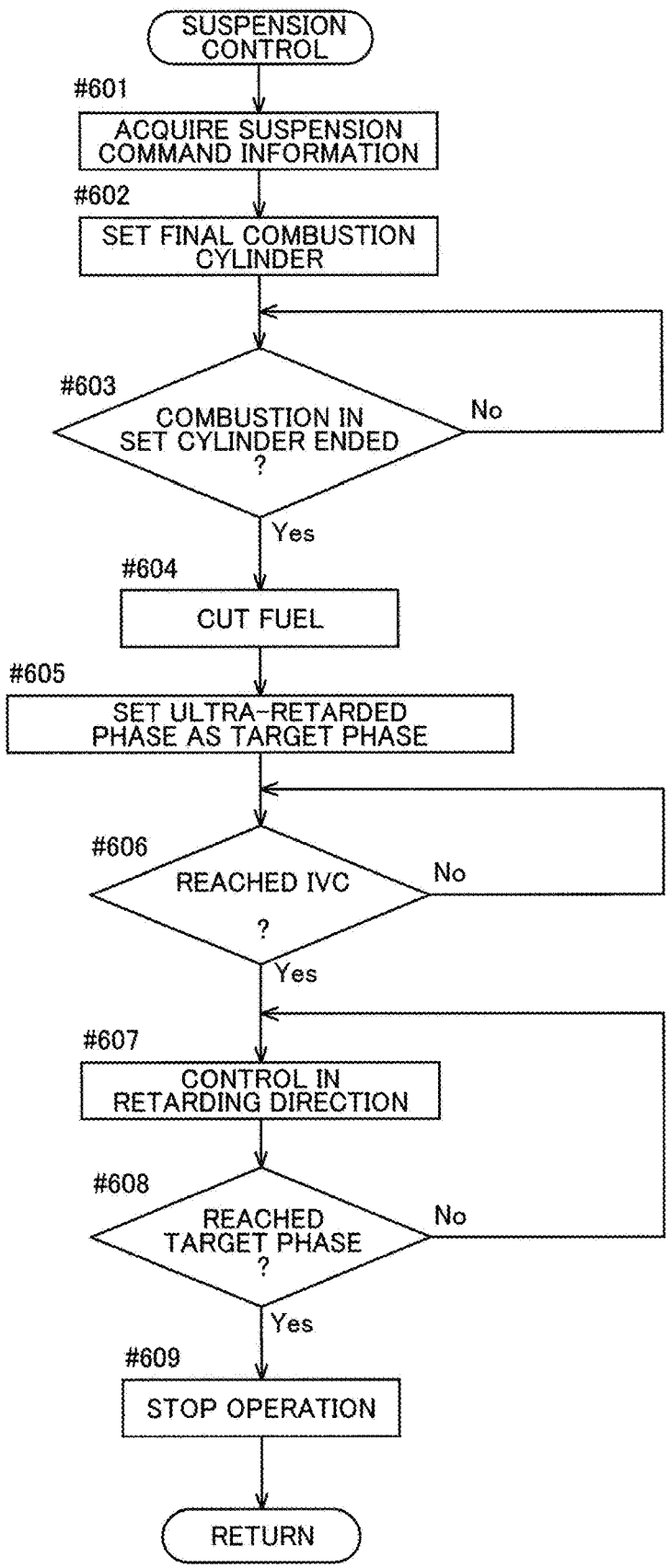
FIG. 17 is a flowchart for suspension control of a fourth embodiment.

For this reason, the engine control apparatus 40 executes the suspension control based on the flowchart of FIG. 17 when the suspension signal information is acquired.

As shown in FIG. 17, if the suspension command information has been acquired, the cylinder in which combustion is to be performed immediately after the timing of acquisition is set as the final combustion cylinder, and fuel cutting is performed after the combustion in the cylinder set in this manner ends (steps #601 to #604).

In the fourth embodiment, as shown in FIG. 1, the injector 9 is an in-cylinder injection type that injects fuel into the combustion chamber, and therefore in step #602, the cylinder in which the fuel is injected by the injector 9 immediately after the suspension command information is acquired is set as the final combustion cylinder.

In contrast to this, if the injector is a port injection type that injects fuel into the intake port, in step #602, the cylinder in which the fuel is injected by the injector immediately before acquiring the suspension command information is set as the final fuel combustion cylinder, although this is not shown in the drawings.

Note that the control for fuel cutting in step #604 need only be performed after the fuel is supplied to the final combustion cylinder, and is not limited to the timing shown in the flowchart.

Next, the ultra-retarded phase is set as the target phase of the valve opening and closing timing control apparatus A, and at the timing immediately after the intake valve Va of the final combustion cylinder reaches the intake closing timing IVC (see FIGS. 6 and 7), the relative rotation phase is changed in the retarding direction Sb through the control of the phase control motor M, and the control is stopped at the time when the relative rotation phase reaches the target phase (steps #605 to #609).

(Operations and Effects of Fourth Embodiment)

By setting the control mode in this manner, it is possible to rapidly transition to the suspended state without needlessly continuing combustion in the internal combustion engine. Also, by performing control in this manner, the amount of shaking accompanying the stopping of the internal combustion engine is reduced, and if the crankshaft 1 rotates in the suspended state, the amount of air that flows from the combustion chamber to the catalyst 13 is reduced, and thus deterioration and erosion of the catalyst 13 is suppressed.

For example, considering a control mode in which the suspension control is executed unconditionally immediately after acquiring the suspension command information, if there is an cylinder in which combustion has not ended in this considered control mode, this leads to an inconvenience in which the suspension control is started and the non-combusted mixed air remains in the combustion chamber in a state in which the engine E is suspended.

If non-combusted mixed air remains in the combustion chamber in a state in which the engine E is suspended, or for example, if the crankshaft 1 rotates due to the rotation force of the wheels, the non-combusted mixed air in the combustion chamber comes into contact with the catalyst 13, causing the catalyst 13 to deteriorate.

Regarding this inconvenience, it is possible to resolve an inconvenience in which the non-combusted mixed air is brought into contact with the catalyst 13 by changing the relative rotation phase in the retarding direction Sb to set it to the ultra-retarded phase through the control of the phase control motor M (retarding control) and performing suspension control after the combustion in the combustion chamber ends, even if the supply system for supplying the fuel to the combustion chamber of the engine E is an in-cylinder injection type that injects fuel into the combustion chamber or a port injection type that injects fuel into the intake port.

The suspension control of the fourth embodiment can be applied to the suspension control of any of the first embodiment, the second embodiment, and the third embodiment. In particular, by setting the control mode as in the fourth embodiment, not only is the suspension control made more rapid, but if the valve opening and closing timing control apparatus A is set to the ultra-retarded phase through retarding control, autonomous running of the engine E is no longer possible, and therefore reliable stopping is enabled.

(Other Embodiments)

Other than the above-described embodiments, the present invention may also be constituted as follows (components having functions that are the same as in the embodiments are denoted by numbers and reference numerals that are the same as in the embodiments).

(a) In a hybrid-type vehicle, when the engine E is stopped and the travel motor is to travel driven by electrical power of a battery, if the driving force from the wheels is transmitted to the crankshaft 1, control for performing retarding control can be performed. That is, a configuration according to which the ultra-retarded phase can be set is used as the valve opening and closing timing control apparatus A, and the engine control apparatus 40 that controls the valve opening and closing timing control apparatus A is included.

There is also a hybrid vehicle in which, even in a state in which the engine E is stopped and travel is performed in a motor travel mode (EV mode) in which travel is performed by driving a travel motor using electrical power of a battery, if an engine brake is needed, the rotational force of the wheels is transmitted to the engine E through a predetermined manual operation, and deceleration can be performed using the engine brake.

Thus, it is also conceivable that the following control is performed in order to execute retarding control of the embodiments of the present invention after the manual operation for causing the engine brake to operate is performed in a state in which travel is performed in the motor travel mode (EV mode).

Figure 18:
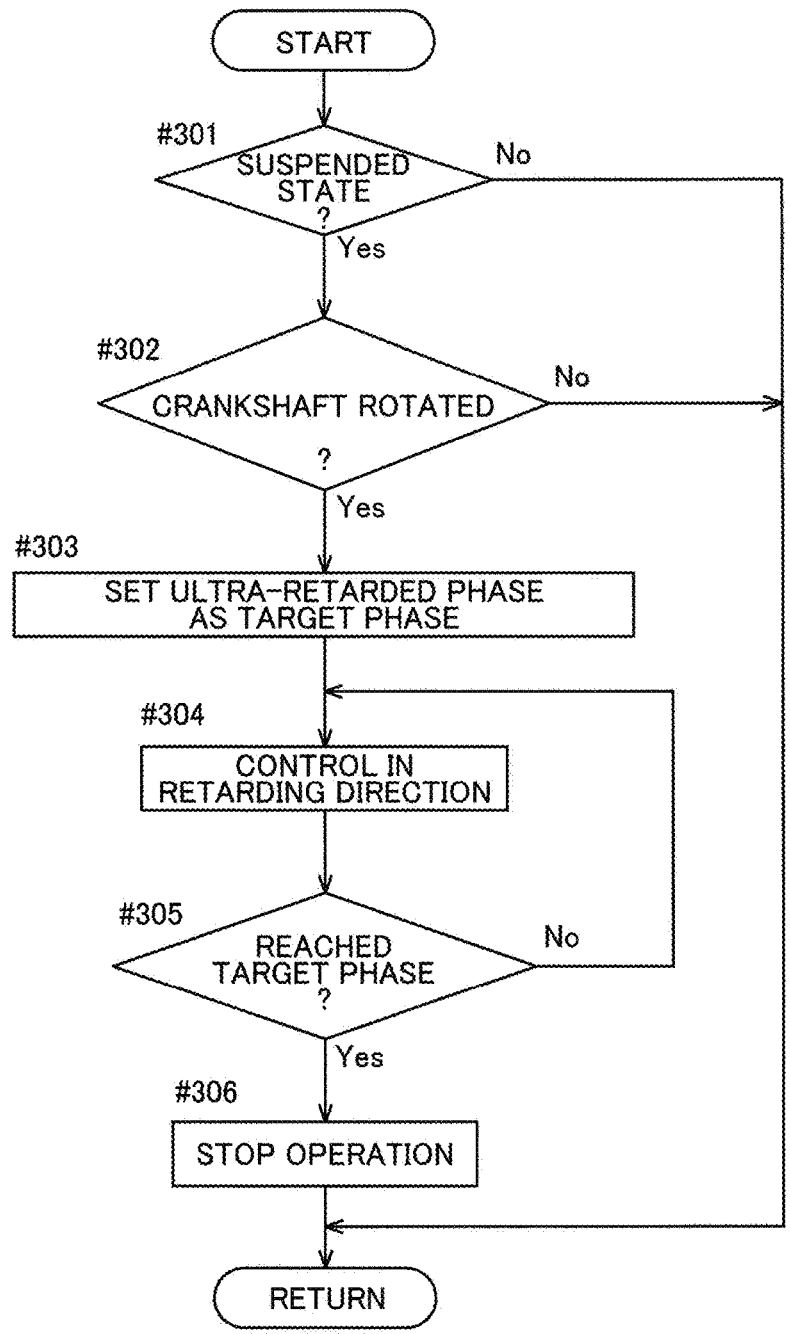
FIG. 18 is flowchart showing retarding control in another embodiment (a).

That is, as shown in the flowchart in FIG. 18, when the crankshaft 1 rotates in a state in which the engine E is in the suspended state, the ultra-retarded phase is set as the target phase of the valve opening and closing timing control apparatus A, control for changing the relative rotation phase in the retarding direction Sb through the control of the phase control motor M is started, and control of the phase is stopped at a time when the relative rotation phase reaches the target phase (steps #301 to #306).

In this manner, by performing retarding control immediately after the crankshaft 1 starts rotation in a state in which the engine E is suspended and setting the valve opening and closing timing control apparatus A to the ultra-retarded phase, the discharge amount of air from the combustion chamber can be significantly reduced, and an inconvenience in which the temperature decrease of the catalyst 13 is incurred or the performance of the catalyst 13 is reduced due to air being brought into contact with the catalyst 13 can be suppressed.

The control shown in the flowchart in FIG. 18 executes the retarding control immediately after the crankshaft 1 starts rotation, but the control mode may also be set such that the retarding control is started at a timing at which it is detected that a manual operation for using the engine brake has been performed as described above.

Furthermore, in a hybrid-type vehicle, in some cases, motoring is performed in which the crankshaft 1 of the engine E is driven and rotated using the electrical power of the battery in order to discharge the electrical power charged in the battery. Due to being configured such that retarding control of the embodiments of the present invention can be performed also when performing this kind of motoring, the discharge amount of the air from the combustion chamber can be significantly reduced, and an inconvenience can be suppressed in which temperature decrease of the catalyst 13 is incurred or a performance decrease is incurred due to air being brought into contact with the catalyst 13.

Also, in a hybrid-type vehicle, an effect of shortening the amount of motoring time for discharging is also obtained. That is, by performing retarding control and setting the valve opening and closing timing control apparatus A to the ultra-retarded phase, the amount of time of the intake stroke in the state in which the intake valve Va is closed increases. Accordingly, piston loss accompanying the movement of the piston 4 of the engine E (internal combustion engine) in the intake stroke increases, and discharging in motoring can be executed in a short amount of time.

(b) In an engine E that has two sets of banks (cylinder rows) and enables suspension control for suspending only combustion in the combustion chambers of one bank (one cylinder row), as with a V-type engine or a horizontal facing engine, a configuration is used in which retarding control can be performed in order to set the valve opening and closing timing control apparatus A of the intake camshafts 7 of the suspended bank to the ultra-retarded phase.

By performing this control, it is possible to suppress a phenomenon in which the air is discharged from the cylinders in the suspended state, and it is possible to suppress an inconvenience in which the air incurs a temperature decrease of the catalyst 13 in the suspended state or a performance decrease is incurred due to the air being brought into contact with the catalyst 13.

(c) The ultra-retarded phase is not necessarily limited to the phase shown in FIG. 8, and may also be obtained by the exhaust closing timing EVC further changing the top dead center TDC in the retarding direction Sb, or changing slightly to the advancing side from the top dead center TDC.

Also, the ultra-retarded phase may also be any phase between the high-temperature start timing LSh and the top dead center TDC although a small amount of air is discharged.

(d) Since the ultra-retarded phase creates a favorable decompression state, the start routine of the engine E is set such that the valve opening and closing timing control apparatus A is set to the ultra-retarded phase until the crankshaft 1 reaches the predetermined rotation during starting of the engine E. By employing this kind of control mode, the rotation rate of the crankshaft 1 can be increased in a very short amount of time and the amount of time needed for starting the engine E can also be shortened.

(e) If the exhaust temperature enters a state of being very high, such as a time when the engine E is performing driving at a high load, the amount of exhaust that flows from the exhaust manifold 12 to the catalyst 13 may also be reduced by performing retarding control on the exhaust valve Vb. In this case, it is possible to suppress catalyst deterioration resulting from the inner portion of the catalyst 13 being dissolved by exhaust with a very high temperature.

Figure 19:
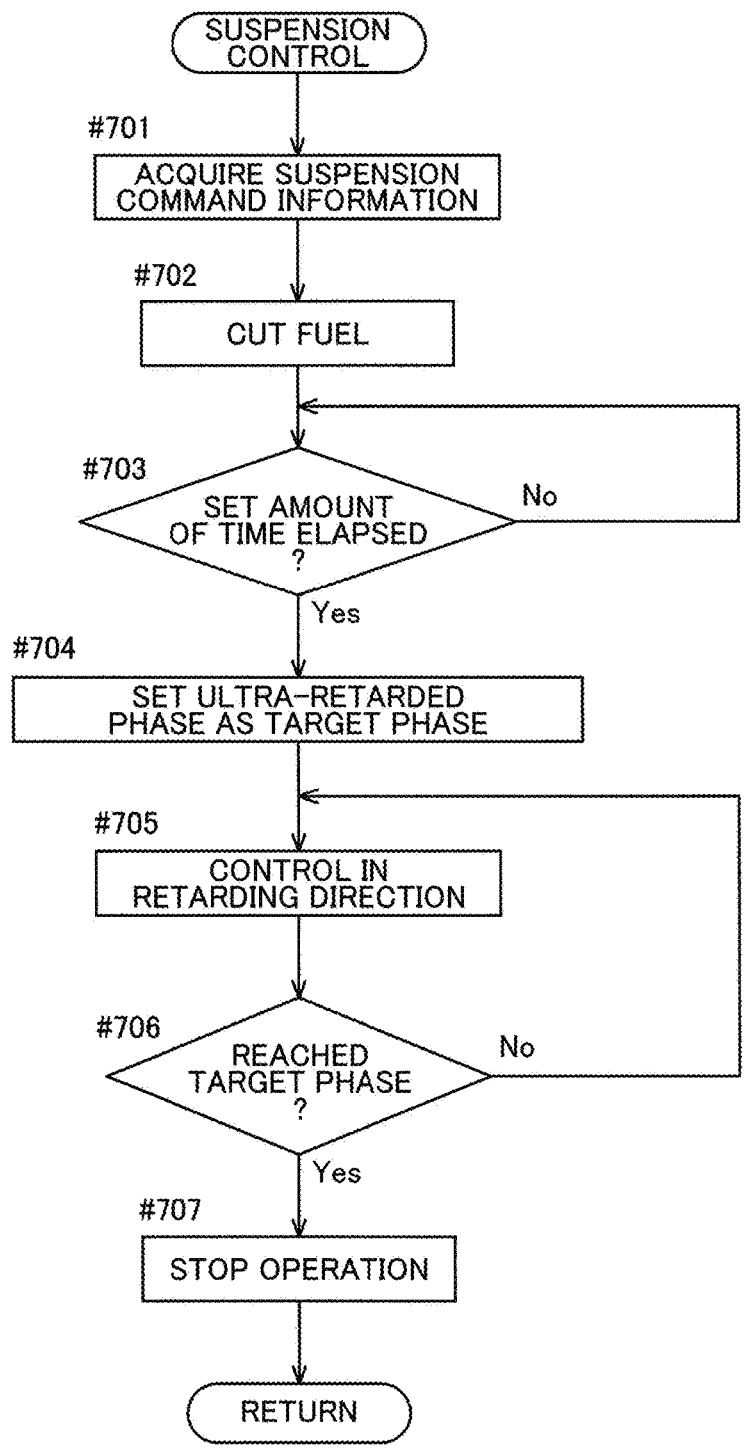
FIG. 19 is a flowchart for suspension control of another embodiment (f).

(f) In the fourth embodiment described above, the final combustion cylinder was set, and the suspension control was performed using the end of combustion in the pre-set cylinder as a reference, but instead of this, the control mode can be set as shown in the flowchart of FIG. 19 or the flowchart of FIG. 20.

In the suspension control shown in FIG. 19, if the suspension command information is acquired, fuel cutting is performed and the elapse of a set amount of time is waited for (steps #701 to #703). Next, after the set amount of time has elapsed, the ultra-retarded phase is set as the target phase of the valve opening and closing timing control apparatus A, the relative rotation phase is changed in the retarding direction Sb through the control of the phase control motor M, and the control is stopped at the time at which the relative rotation phase reaches the target phase (steps #704 to #707).

In this manner, by performing fuel cutting immediately after acquiring the suspension command information and furthermore setting an amount of time that is sufficient for ending combustion in the combustion chamber to which the fuel was supplied as the set amount of time, an inconvenience is not incurred in which non-combusted mixed air remains in the combustion chamber in a state in which the engine E is suspended.

Also, in the suspension control shown in FIG. 20, if the suspension command information is acquired, fuel cutting is performed, and standby is performed until the amount of change in the crank angle exceeds a set value (steps #801 to #803). Furthermore, after the amount of change in the crank angle exceeds the setting, the ultra-retarded phase is set as the target phase of the valve opening and closing timing control apparatus A, the relative rotation phase is changed in the retarding direction Sb through the control of the phase control motor M, and the control is stopped at the time when the relative rotation phase reaches the target phase (steps #804 to #807).

In this manner, by performing fuel cutting immediately after acquiring the suspension command information and furthermore setting a crank angle that is sufficient for ending the combustion in the combustion chamber to which the fuel was supplied as the set value, an inconvenience is not incurred in which the non-combusted mixed air remains in the combustion chamber in the state in which the engine E is suspended.

In the other embodiment (f), although a slightly greater amount of time is needed to suspend the engine E compared to the configuration of the fourth embodiment, the amount of time for suspending the engine E can be shortened compared to the configuration in which suspension control is performed using the end of combustion in the pre-set cylinder as a reference.

(g) When the engine E is to be stopped, the control shown in the flowchart in FIG. 21 is executed. That is, in the stop control shown in FIG. 21, if stop command information is acquired, the relative rotation phase of the valve opening and closing timing control apparatus A is acquired (steps #901 and #902).

If the relative rotation phase acquired in this manner is not in the ultra-retarded phase, the ultra-retarded phase is set as the target phase of the valve opening and closing timing control apparatus A, the relative rotation phase is changed in the retarding direction Sb through the control of the phase control motor M, and the control is stopped at the time when the relative rotation phase reaches the target phase (steps #903 to #906).

In contrast to this, the engine E is stopped through fuel cutting if the relative rotation phase is already at the ultra-retarded phase, and after the control of step #906 ends (step #907).

By performing this kind of control, the valve opening and closing timing control apparatus A is set to the ultra-retarded phase immediately before the engine E is stopped, the shaking of the engine E during complete stopping is suppressed by decompression, and engine stop without shaking is realized.

INDUSTRIAL APPLICABILITY

The present invention can be used in a valve opening and closing timing control apparatus for setting an opening/closing timing of an intake valve of an internal combustion engine.

REFERENCE SIGNS LIST

1: Crankshaft
7: Intake camshaft
9: Injector
21: Driving case (driving-side rotating body)
22: Internal rotor (driven-side rotating body)
43: Suspension control unit
46: Catalyst temperature sensor (catalyst temperature acquisition unit)
51: First oxygen concentration sensor (oxygen concentration acquisition unit)
52: Second oxygen concentration sensor (oxygen concentration acquisition unit)
E: Engine (internal combustion engine)
M: Phase control motor (electric motor)
Va: Intake valve
Vb: Exhaust valve
X: Rotation axis

The invention claimed is:

1. A valve opening and closing timing control apparatus comprising:
   a driving-side rotating body that is arranged rotatably about a rotation axis and is configured to rotate synchronously with a crankshaft of an internal combustion engine;
   a driven-side rotating body that is arranged rotatably about the rotation axis so as to rotate relative to the driving-side rotating body, and is configured to rotate integrally with a camshaft that opens and closes an intake valve of the internal combustion engine;
   a phase adjustment mechanism configured to set a relative rotation phase of the driving-side rotating body and the driven-side rotating body using a driving force of an electric motor; and
   a suspension control unit configured to perform retarding control for setting the relative rotation phase on a retarding side until reaching a phase in which the internal combustion engine cannot be started and autonomous running is not possible even if fuel injection and ignition are performed in the internal combustion engine; wherein
   in the retarding control performed by the suspension control unit, in a condition that a top dead center is 0 degrees or 360 degrees and a bottom dead center is 180 degrees, the phase is set so that an intake opening timing is between 90 degrees and 180 degrees, an intake closing timing is between 270 degrees and 360 degrees, and a difference, measured in degrees, between the intake closing timing and bottom dead center is greater than or equal to twice a difference, measured in degrees, between bottom dead center and the intake opening timing.

2. The valve opening and closing timing control apparatus according to claim 1, wherein through the retarding control, the suspension control unit opens the intake valve until a compression stroke ends in a combustion chamber of the internal combustion engine.

3. The valve opening and closing timing control apparatus according to claim 1, wherein
   the suspension control unit is allowed to perform suspension control for suspending combustion in the combustion chamber of the internal combustion engine through fuel cutting, and
   when the crankshaft rotates due to a force from outside of the internal combustion engine in a state in which the suspension control is being executed, the suspension control unit performs the retarding control after the rotation is started.

4. The valve opening and closing timing control apparatus according to claim 1, wherein
   the suspension control unit is allowed to perform suspension control for suspending combustion in the combustion chamber of the internal combustion engine through fuel cutting, and
   a timing at which the retarding control is executed is set to immediately after the suspension control is executed.

5. The valve opening and closing timing control apparatus according to claim 1, further comprising
   a catalyst temperature acquisition unit configured to acquire a temperature of a catalyst for purifying exhaust gas of the internal combustion engine,
   wherein in a state in which the suspension control in which combustion in the combustion chamber of the internal combustion engine is suspended through fuel cutting has been executed, the suspension control unit performs determination of whether or not the retarding control is needed based on a catalyst temperature acquired by the catalyst temperature acquisition unit.

6. The valve opening and closing timing control apparatus according to claim 5, wherein the suspension control unit does not perform the retarding control if the catalyst temperature acquired by the catalyst temperature acquisition unit is less than a first set temperature.

7. The valve opening and closing timing control apparatus according to claim 5, wherein the suspension control unit performs the retarding control if the catalyst temperature acquired by the catalyst temperature acquisition unit is a second set temperature or more.

8. The valve opening and closing timing control apparatus according to claim 1, further comprising
- an oxygen concentration acquisition unit configured to acquire an oxygen concentration of oxygen included in a catalyst for purifying exhaust gas of the internal combustion engine,
- wherein in a state in which the suspension control in which combustion in the combustion chamber of the internal combustion engine is suspended through fuel cutting has been performed, the suspension control unit performs determination of whether or not the retarding control is needed based on the oxygen concentration acquired by the oxygen concentration acquisition unit.

9. The valve opening and closing timing control apparatus according to claim 8, wherein the suspension control unit does not perform the retarding control if the oxygen concentration acquired by the oxygen concentration acquisition unit is less than a set concentration value.

10. The valve opening and closing timing control apparatus according to claim 8, wherein the suspension control unit performs the retarding control if the oxygen concentration acquired by the oxygen concentration acquisition unit is a set concentration value or more.

11. The valve opening and closing timing control apparatus according to claim 1, wherein
- the internal combustion engine has a structure with a plurality of cylinders, and is configured to supply fuel and perform ignition in a predetermined order in respective combustion chambers of the plurality of cylinders,
- the suspension control unit is allowed to perform suspension control for suspending combustion in the combustion chambers of the internal combustion engine through fuel cutting, and
- if suspension command information for performing the suspension control has been acquired, the suspension control unit sets the cylinder in which combustion is to be performed immediately after the timing of acquiring the suspension command information as a final combustion cylinder, and performs the retarding control immediately after closing an intake valve of the final combustion cylinder after combustion in the final combustion cylinder.

12. The valve opening and closing timing control apparatus according to claim 11, wherein the internal combustion engine includes an injector for injecting fuel into the respective combustion chambers of the plurality of cylinders, and the suspension control unit sets the cylinder into which fuel has been injected by the injector immediately after the timing of acquiring the suspension command information as the final combustion cylinder.

13. The valve opening and closing timing control apparatus according to claim 11, wherein the internal combustion engine includes an injector for injecting fuel into respective intake ports of the plurality of cylinders, and the suspension control unit sets the cylinder into which fuel has been injected by the injector immediately before the timing of acquiring the suspension command information as the final combustion cylinder.

\* \* \* \* \*